(12) United States Patent
Yamashita

(10) Patent No.: US 10,395,619 B2
(45) Date of Patent: Aug. 27, 2019

(54) PROFILE ADJUSTMENT SYSTEM, PROFILE ADJUSTMENT DEVICE, AND PROFILE ADJUSTMENT METHOD

(71) Applicant: SEIKO EPSON CORPORATION, Tokyo (JP)

(72) Inventor: Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/180,075

(22) Filed: Nov. 5, 2018

(65) Prior Publication Data

US 2019/0139511 A1 May 9, 2019

(30) Foreign Application Priority Data

Nov. 6, 2017 (JP) .................. 2017-213525

(51) Int. Cl.
```
G09G 5/02      (2006.01)
H04N 1/60      (2006.01)
G06F 3/0482    (2013.01)
G06F 3/0486    (2013.01)
G06F 3/12      (2006.01)
G06F 3/0484    (2013.01)
```

(52) U.S. Cl.
CPC ............. *G09G 5/02* (2013.01); *G06F 3/0482* (2013.01); *G06F 3/0486* (2013.01); *G06F 3/04847* (2013.01); *G06F 3/12* (2013.01); *H04N 1/6025* (2013.01); *H04N 1/6027* (2013.01); *G09G 2320/0666* (2013.01); *G09G 2340/06* (2013.01)

(58) Field of Classification Search
CPC ............. G09G 5/02; G09G 2320/0666; G09G 2340/06; G06F 3/0486; G06F 3/0482; H04N 1/6025; H04N 1/6027

USPC .......................................................... 345/589
See application file for complete search history.

(56) References Cited

U.S. PATENT DOCUMENTS

| | | | |
|---|---|---|---|
| 2004/0130682 A1* | 7/2004 | Tomita | H04N 5/913 353/31 |
| 2004/0183813 A1* | 9/2004 | Edge | H04N 1/6052 345/600 |
| 2004/0233217 A1* | 11/2004 | Chiu | G06T 1/60 345/601 |
| 2007/0296988 A1* | 12/2007 | Tsuji | H04N 1/6052 358/1.9 |

(Continued)

FOREIGN PATENT DOCUMENTS

JP    2010-114532 A    5/2010

*Primary Examiner* — Ke Xiao
*Assistant Examiner* — Kim Thanh T Tran

(57) ABSTRACT

A profile adjustment system displays, in a display device 115, an input field of a coordinate of an adjustment point P0 disposed on a color space, and includes an adjustment coordinate reception unit U1, an adjustment influence range reception unit U3, a linking configuration reception unit U4, a linking configuration display processing unit UA, an adjustment coordinate configuration unit U5, an adjustment influence range configuration unit U6, a whole adjustment influence range display processing unit UB configured to display, in the display device 115, a whole adjustment influence range including U3, U4, U5, and U6, and a profile adjustment unit U7 configured to adjust a profile based on all adjustment points P0 configured in the adjustment coordinate reception unit U1 and an adjustment point Qx added by the adjustment coordinate configuration unit U5.

12 Claims, 21 Drawing Sheets

(56) References Cited

U.S. PATENT DOCUMENTS

2011/0080600 A1\* 4/2011 Hibi .................. H04N 1/54
358/1.9

\* cited by examiner

PROFILE ADJUSTMENT SYSTEM, PROFILE ADJUSTMENT DEVICE, AND PROFILE ADJUSTMENT METHOD

BACKGROUND

1. Technical Field

The present invention relates to a technology for adjusting a profile used for a conversion of a coordinate value of a color space.

2. Related Art

When using an ink jet printer in a printing proofing application such as offset printing, a required color reproduction accuracy (a degree of exactly reproducing a color) is very high. A mechanism to achieve the above-mentioned accuracy includes a color management system using an International Color Consortium (ICC) profile. The ICC profile is data representing a correspondence relationship between a device-dependent color of a color device such as a printing machine (for example, an offset printing machine) and an ink jet-type printer and a device-independent color. The device-dependent color of the printing machine or the ink jet printer is represented, for example, by a CMYK value representing a usage amount of cyan (C), magenta (M), yellow (Y), and black (K). The device-independent color is represented, for example, by a color value in Commission Internationale de l'Eclairage (CIE: the International Commission on Illumination)) L*a*b* color space
(referred to as an Lab value without "*") or a color value in a CIEXYZ color space, each of the color spaces being a device-independent color space.

Here, an ICC profile of a printing machine is set as an input profile and an ICC profile of an ink jet printer is set as an output profile. When converting a CMYK value (hereinafter, a $CMYK_t$ value) in a printing machine into a Profile Connection Space (PCS) color value (for example, an Lab value) in accordance with the input profile, the color value can be converted into a CMYK value (hereinafter, a $CMYK_p$ value) of the ink jet printer in accordance with the output profile. When performing printing by the ink jet printer in accordance with the $CMYK_p$ value, it is possible to reproduce, by the ink jet printer, a color close to a color of the printing machine. In actuality, an expected color may not be reproduced due to a profile error, a color measurement error, a fluctuation of the printer, or the like. In such a case, a conversion accuracy of a target color is increased by correcting the ICC profile.

JP-A-2010-114532 proposes to display, in accordance with a designation of an adjustment range, a region to be adjusted in a display unit, along with a method for adjusting a color conversion table.

However, some users may demand to adjust not only a single color (hereinafter, a point P1), but all colors continuous from the color (for example, white) to another color (hereinafter, a point P2, for example, red). When configuring an influence range only for the adjustment points P1 and P2, a gradation of an output image may deteriorate depending on a configuration value. In this case, many adjustment points and influence ranges also need to be configured between the adjustment points P1 and P2. Especially, when the adjustment points P1 and P2 are separated from each other, even more adjustment points and influence ranges need to be configured according to the separation. Thus, the configuration is extremely complicated.

Additionally, in a display of a region to be adjusted when a plurality of adjustment points (P1, P2, . . . ) are designated, a point to be considered is not included such as the overlapping of influence ranges, and thus, it is difficult to notify the users of an exact region to be adjusted.

SUMMARY

One advantage of some aspects of the invention is to provide a technology capable of easily adjusting a color conversion table with maintaining a gradation while a user exactly grasps the influence range of an adjustment.

Application Example 1

A profile adjustment system according to an application example is configured to adjust, based on a parameter displayed in a display unit, a profile specifying a correspondence relationship between an input coordinate value of an input color space and an output coordinate value of an output color space. The profile adjustment system includes: an adjustment coordinate reception unit configured to display, in the display unit, an input field of a coordinate of an adjustment point disposed on the color space and to receive a coordinate configuration of the adjustment point, an adjustment influence range reception unit configured to display, in the display unit, an input field of an adjustment influence range of the adjustment point disposed on the color space and to receive a configuration of an adjustment influence range of the adjustment point, a linking configuration reception unit configured to display, in the display unit, an input field of a linking configuration between each of at least two or more of the adjustment points configured in the adjustment coordinate reception unit and the adjustment influence range reception unit and to receive a linking configuration between each of the adjustment points as needed, a linking configuration display processing unit configured to display, in the display unit, a linking configuration condition configured in the linking configuration reception unit, an adjustment coordinate configuration unit configured to configure a coordinate of a new adjustment point between each of the adjustment points configured in the linking configuration reception unit, an adjustment influence range configuration unit configured to configure an adjustment influence range for the new adjustment point configured in the adjustment coordinate configuration unit, a whole adjustment influence range display processing unit configured to display, in the display unit, a whole adjustment influence range including the adjustment influence range reception unit, the linking configuration reception unit, the adjustment coordinate configuration unit, and the adjustment influence range configuration unit, and a profile adjustment unit configured to adjust the profile based on all adjustment points configured in the adjustment coordinate reception unit and an adjustment point added by the adjustment coordinate configuration unit.

According to the application example, when the user configures a plurality of adjustment points in the adjustment coordinate reception unit and configures a linking between each adjustment point in the linking configuration reception unit, a coordinate of a new adjustment point is automatically configured by the adjustment coordinate configuration unit and an adjustment influence range corresponding to the new adjustment point is configured in the adjustment influence range configuration unit.

Thus, a color conversion table can be easily adjusted with maintaining a gradation.

Furthermore, according to the application example, it is possible to visually display the adjustment influence range in the whole adjustment influence range display processing unit. Thus, the influence range can be grasped before adjusting the color conversion table, and therefore, the number of trial-and-error processes for the adjustment can be reduced.

Application Example 2

The profile adjustment system according to the above-described application example may include: an identifier assignment unit configured to assign an identifier to an adjustment point configured in the adjustment coordinate reception unit, an identifier display processing unit configured to associate the identifier assigned by the identifier assignment unit with the coordinate configured in the adjustment coordinate reception unit and to display the identifier associated with the coordinate in the display unit, and an adjustment point display processing unit configured to display a list of all adjustment points configured in the adjustment coordinate reception unit, in the display unit. The linking configuration reception unit may perform linking configuration by designating the identifier assigned by the identifier assignment unit.

According to the application example, the linking configuration can be easily applied by using the identifier in the linking configuration reception unit, and thus, a color conversion table can be more easily adjusted with maintaining a gradation.

Application Example 3

The profile adjustment system according to the above-described application example may include an adjustment point display processing unit configured to display a list of all adjustment points configured in the adjustment coordinate reception unit, in the display unit, and the linking configuration reception unit may perform linking configuration by changing an alignment order of all the adjustment points displayed in the list.

According to the application example, the linking configuration can be easily applied in the linking configuration reception unit by changing the alignment order on the displayed list, and thus, a color conversion table can be more easily adjusted with maintaining a gradation.

Application Example 4

The profile adjustment system according to the above-described application example may include an adjustment point display processing unit configured to display a list of all adjustment points configured in the adjustment coordinate reception unit, in the display unit, and the linking configuration reception unit may perform linking configuration by a drag-and-drop operation between two arbitrarily selected points among all the adjustment points displayed in the list.

According to the application example, the linking configuration between the two points can be easily applied in the linking configuration reception unit by a drag-and-drop operation of the adjustment points arbitrarily selected from the displayed list, and thus, a color conversion table can be more easily adjusted with maintaining a gradation.

Application Example 5

The profile adjustment system according to the above-described application example may include an adjustment point display processing unit configured to display a list of all the adjustment points configured in the adjustment coordinate reception unit, in the display unit, a line-drawing designation unit configured to designate, for the display unit, a line connecting all the adjustment points displayed in the list, and a line-drawing processing unit configured to display the line designated by the line-drawing designation unit, in the display unit. The linking configuration reception unit may perform a linking configuration for the adjustment points displayed in the list, by designating linking of the adjustment points with a line in the line-drawing designation unit.

According to the application example, the linking configuration can be easily applied in the linking configuration reception unit by drawing the line linking the adjustment points from the displayed list, and thus, a color conversion table can be more easily adjusted with maintaining a gradation.

Application Example 6

The profile adjustment system according to the above-described application example may include an adjustment point display processing unit configured to display a list of all the adjustment points configured in the adjustment coordinate reception unit, in the display unit, and the linking configuration reception unit may perform linking configuration according to a selection order of the adjustment points displayed in the list.

According to the application example, the linking configuration can be easily applied in the linking configuration reception unit according to a selection order from the displayed list, and thus, a color conversion table can be more easily adjusted with maintaining a gradation.

Application Example 7

The profile adjustment system according to the above-described application example may include an image display processing unit configured to display any image in the display unit, and the whole adjustment influence range display processing unit may display a region included in the whole adjustment influence range in an overlapping manner on any image displayed in the display unit by the image display processing unit.

According to the application example, the whole adjustment influence range display processing unit can display a region included in the whole adjustment influence range in an overlapping manner on any image displayed in the display unit by the image display processing unit. Thus, the user can exactly grasp where on an image to which the adjusted profile is applied, an influence occurs, and therefore, can grasp the influence range before adjusting the color conversion table; thus, the number of trial-and-error processes for the adjustment can be reduced.

Application Example 8

The profile adjustment system according to the above-described application example may include an input color space display processing unit configured to display, in the display unit, an input color space shape of a profile to be adjusted. The whole influence range display processing unit may display the whole adjustment influence range in an overlapping manner on the input color space shape drawn in the display unit, by the input color space display processing unit.

According to the application example, the whole adjustment influence range display processing unit can display the whole adjustment influence range in an overlapping manner on the input color space shape drawn in the display unit by the input color space display processing unit. Thus, the user can grasp the influence range before adjusting the color conversion table, and therefore, the number of trial-and-error processes for the adjustment can be reduced.

Application Example 9

The profile adjustment system according to the above-described application example may include a color conversion unit configured to convert the whole adjustment influence range configured in the adjustment influence range reception unit and the adjustment influence range configuration unit into an Lab space, and a gamut display processing unit configured to display, in the display unit, a gamut model shape of the profile to be adjusted. The whole influence range display processing unit may display the whole adjustment influence range in an overlapping manner on the gamut shape drawn in the display unit by the gamut display processing unit.

According to the application example, the whole adjustment influence range display processing unit can display the whole adjustment influence range in an overlapping manner on the gamut shape drawn in the display unit by the gamut display processing unit. Thus, the user can grasp the influence range before adjusting the color conversion table, and therefore, the number of trial-and-error processes for the adjustment can be reduced.

Application Example 10

The profile adjustment system according to the above-described application example may include a gradation image generation unit configured to generate a gradation image linking any two of the adjustment points. The whole adjustment influence range display processing unit may display, in the display unit, a gradation image generated by the gradation image generation unit, based on each adjustment point designated by the linking configuration reception unit.

According to the application example, the whole adjustment influence range display processing unit can display, in the display unit, a gradation image generated by the gradation image generation unit, based on each adjustment point designated by the linking configuration reception unit. Thus, the user can grasp the influence range before adjusting the color conversion table, and therefore, the number of trial-and-error processes for the adjustment can be reduced.

Application Example 11

A profile adjustment device according to the application example is configured to adjust, based on a parameter displayed in a display unit, a profile specifying a correspondence relationship between an input coordinate value of an input color space and an output coordinate value of an output color space. The profile adjustment device includes: an adjustment coordinate reception unit configured to display, in the display unit, an input field of a coordinate of an adjustment point disposed on the color space and to receive a coordinate configuration of the adjustment point, an adjustment influence range reception unit configured to display, in the display unit, an input field of an adjustment influence range of the adjustment point disposed on the color space and to receive a configuration of an adjustment influence range of the adjustment point, a linking configuration reception unit configured to display, in the display unit, an input field of a linking configuration between each of at least two or more of the adjustment points configured in the adjustment coordinate reception unit and the adjustment influence range reception unit and to receive a linking configuration between each of the adjustment points as needed, a linking configuration display processing unit configured to display, in the display unit, a linking configuration condition configured in the linking configuration reception unit, an adjustment coordinate configuration unit configured to configure a coordinate of a new adjustment point between each of the adjustment points configured in the linking configuration reception unit, an adjustment influence range configuration unit configured to configure an adjustment influence range for the new adjustment point configured in the adjustment coordinate configuration unit, a whole adjustment influence range display processing unit configured to display, in the display unit, a whole adjustment influence range including the adjustment influence range reception unit, the linking configuration reception unit, the adjustment coordinate configuration unit, and the adjustment influence range configuration unit, and a profile adjustment unit configured to adjust the profile based on all adjustment points configured in the adjustment coordinate reception unit and an adjustment point added by the adjustment coordinate configuration unit.

According to the application example, when the user configures a plurality of adjustment points in the adjustment coordinate reception unit and configures a linking between each of the adjustment points in the linking configuration reception unit, a coordinate of a new adjustment point is automatically configured by the adjustment coordinate configuration unit and an adjustment influence range corresponding to the new adjustment point is configured in the adjustment influence range configuration unit.

Thus, a color conversion table can be easily adjusted with maintaining a gradation.

Furthermore, according to the application example, it is possible to visually display the adjustment influence range in the whole adjustment influence range display processing unit. Thus, the influence range can be grasped before adjusting the color conversion table, and therefore, the number of trial-and-error processes for the adjustment can be reduced.

Application Example 12

A profile adjustment method according to the application example is a profile adjustment method of adjusting, based on a parameter displayed in a display unit, a profile specifying a correspondence relationship between an input coordinate value of an input color space and an output coordinate value of an output color space. The profile adjustment method includes: performing adjustment coordinate reception including displaying, in the display unit, an input field of a coordinate of an adjustment point disposed on the color space and receiving a coordinate configuration of the adjustment point, performing adjustment influence range reception including displaying, in the display unit, an input field of an adjustment influence range of the adjustment point disposed on the color space and receiving a configuration of an adjustment influence range of the adjustment point, performing linking configuration reception including displaying, in the display unit, an input field of a linking configuration between each of at least two or more of the adjustment points configured during the adjustment coordinate reception and the adjustment influence range reception and receiving a linking configuration between each of the adjustment points as needed, performing linking configuration display processing including displaying, in the display unit, a linking configuration condition configured during the linking configuration reception step, performing adjustment coordinate configuration including configuring a coordinate of a new adjustment point between each of the adjustment points configured during the linking configuration reception step, performing adjustment influence range configuration including configuring an adjustment influence range for the new adjustment point configured during the adjustment coordinate configuration, performing whole adjustment influence range display processing including displaying, in the display unit, a whole adjustment influence range including the adjustment influence range reception, the linking configuration reception, the adjustment coordinate configuration, and the adjustment influence range configuration, and performing profile adjustment including adjusting the profile based on all adjustment points configured during the adjustment coordinate reception and an adjustment point added during the adjustment coordinate configuration.

According to the application example, when the user configures a plurality of adjustment points in an adjustment coordinate reception unit and configures a linking between each of the adjustment points in a linking configuration reception unit, a coordinate of a new adjustment point is automatically configured by the adjustment coordinate configuration unit and an adjustment influence range corresponding to the new adjustment point is configured in an adjustment influence range configuration unit.

Thus, a color conversion table can be easily adjusted with maintaining a gradation.

Furthermore, according to the application example, it is possible to visually display the adjustment influence range in a whole adjustment influence range display processing unit. Thus, the influence range can be grasped before adjusting the color conversion table, and therefore, the number of trial-and-error processes for the adjustment can be reduced.

Application Example 13

A profile adjustment program according to the application example is a profile adjustment program for adjusting, based on a parameter displayed in a display unit, a profile specifying a correspondence relationship between an input coordinate value of an input color space and an output coordinate value of an output color space. The profile adjustment program includes: an adjustment coordinate reception function of displaying, in the display unit, an input field of a coordinate of an adjustment point disposed on the color space and receiving a coordinate configuration of the adjustment point, an adjustment influence range reception function of displaying, in the display unit, an input field of an adjustment influence range of the adjustment point disposed on the color space and receiving a configuration of an adjustment influence range of the adjustment point, a linking configuration reception function of displaying, in the display unit, an input field of a linking configuration between each of at least two or more of the adjustment points configured in the adjustment coordinate reception function and the adjustment influence range reception function and receiving a linking configuration between each of the adjustment points as needed, a linking configuration display processing function of displaying, in the display unit, a linking configuration condition configured by the linking configuration reception function, an adjustment coordinate configuration function of configuring a coordinate of a new adjustment point between each of the adjustment points configured by the linking configuration reception function, an adjustment influence range configuration function of configuring an adjustment influence range for the new adjustment point configured by the adjustment coordinate configuration function, a whole adjustment influence range display processing function of displaying, in the display unit, a whole adjustment influence range including the adjustment influence range reception function, the linking configuration reception function, the adjustment coordinate configuration function, and the adjustment influence range configuration function, and a profile adjustment function of adjusting the profile based on all adjustment points configured in the adjustment coordinate reception function and an adjustment point added in the adjustment coordinate configuration function.

According to the application example, when the user configures a plurality of adjustment points in an adjustment coordinate reception unit and configures a linking between each of the adjustment points in a linking configuration reception unit, a coordinate of a new adjustment point is automatically configured by an adjustment coordinate configuration unit and an adjustment influence range corresponding to the new adjustment point is configured in an adjustment influence range configuration unit.

Thus, a color conversion table can be easily adjusted with maintaining a gradation.

Furthermore, according to the application example, it is possible to visually display the adjustment influence range in a whole adjustment influence range display processing unit. Thus, the influence range can be grasped before adjusting the color conversion table, and therefore, the number of trial-and-error processes for the adjustment can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the present invention will be described below with reference to the accompanying drawings. Needless to say, the exemplary embodiment below is only an example for illustrating the present invention and not all characteristics indicated in the exemplary embodiment may be required as means for solving the technical problem in the invention. Note that, in each of the drawings below, to make each of layers and each of members a recognizable size, each of the layers and each of the members are illustrated to be different from an actual scale.

1. Specific Example of Profile Adjustment System Configuration

Figure 1:
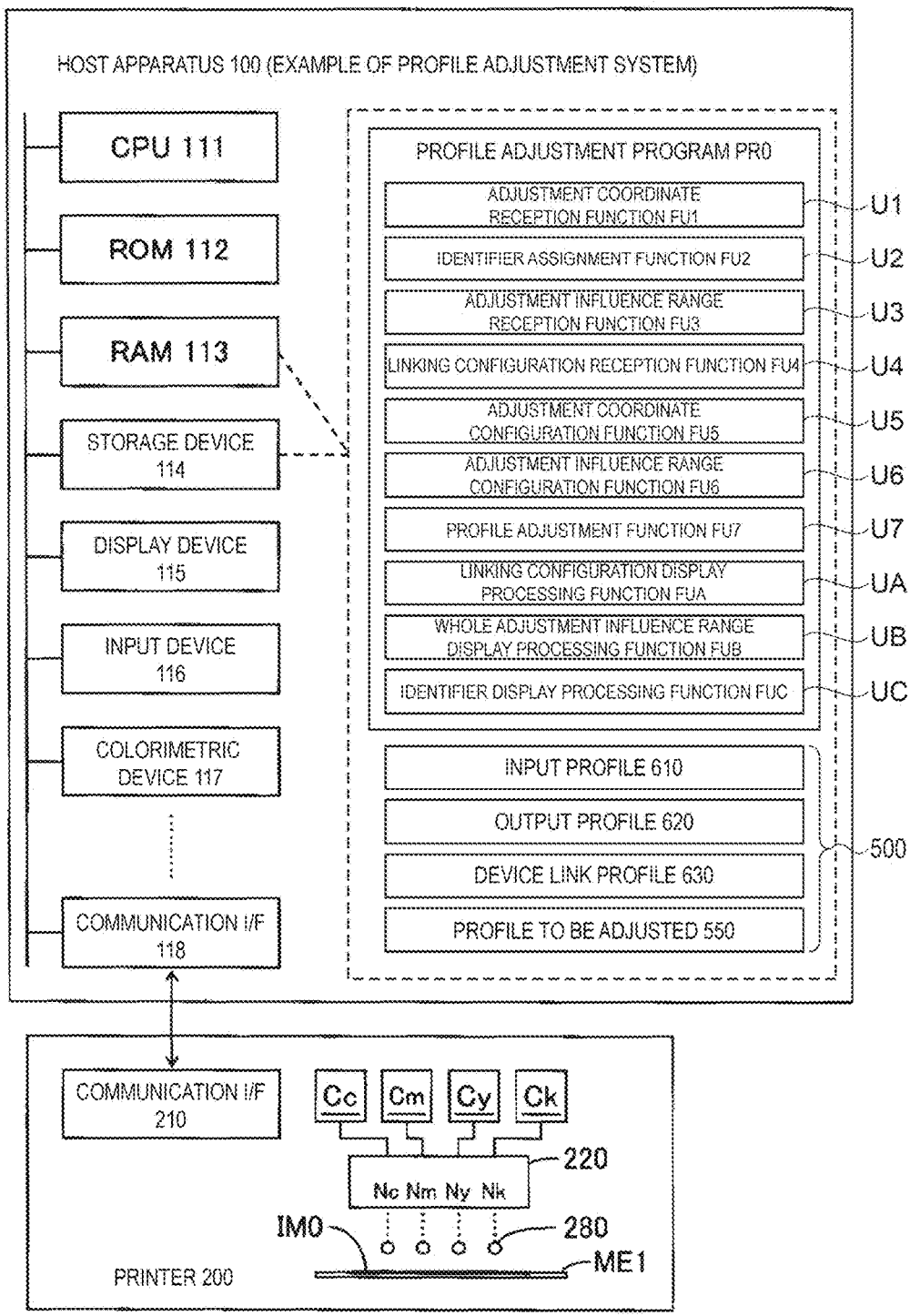
FIG. 1 shows a block diagram schematically illustrating a configuration example of a profile adjustment system.

FIG. 1 schematically illustrates a host apparatus 100 and a printer 200 as a configuration example of a profile adjustment system. The profile adjustment system is constituted by the host apparatus 100 and the printer 200. The host apparatus 100 is coupled with a Central Processing Unit (CPU) 111, a Read Only Memory (ROM) 112, a Random Access Memory (RAM) 113, a storage device 114, a display device 115, an input device 116, a colorimetric device 117, a communication interface (I/F) 118, and the like, and the components are configured to input and output information from and to each other.

The storage device 114 is configured to store an operating system (OS) (not illustrated), a profile adjustment program PR0, and the like. The OS, the PR0, and the like are loaded into the RAM 113 as needed and used for an adjustment process of a profile 500. Here, the profile 500 is a collective term for an input profile 610, an output profile 620, a device link profile 630, and a profile to be adjusted 550. At least one of the RAM 113 and the storage device 114 stores various types of information such as the input profile 610, the output profile 620, and the device link profile 630. A non-volatile semiconductor memory such as a flash memory, a magnetic storage device such as a hard disk, and the like, can be used for the storage device 114.

A liquid crystal display panel and the like can be used for the display device 115. A pointing device, a hard key including a keyboard, a touch panel attached to a surface of a display panel, or the like, can be used for the input device 116. The colorimetric device 117 can measure color of each color patch formed on a print substrate that is an example of a medium on which a color chart is formed and output the colorimetric value. The patch is also referred to as a color standard. The colorimetric value is, for example, a value representing lightness L and chromaticity coordinates a and b in the CIELab color space. The colorimetric device 117 may be disposed outside of the host apparatus 100. The host apparatus 100 obtains colorimetric data including a plurality of colorimetric values from the colorimetric device 117 to perform various types of processes. The communication I/F 118 is coupled to a communication I/F 210 of the printer 200 and inputs and outputs information such as print data from and to the printer 200. Universal Serial Bus (USB), Near Field Communication, or the like can be used as a standard to which the communication I/Fs 118, 210 conform. The communication I/Fs 118, 210 may communicate by wire or wireless, or over a network such as Local Area Network (LAN) or the Internet.

The profile adjustment program PR0 illustrated in FIG. 1 causes the host apparatus 100 to realize an adjustment coordinate reception function FU1, an identifier assignment function FU2, an adjustment influence range reception function FU3, a linking configuration reception function FU4, an adjustment coordinate configuration function FU5, an adjustment influence range configuration function FU6, a profile adjustment function FU7, a linking configuration display processing function FUA, a whole adjustment influence range display processing function FUB, and an identifier display processing function FUC.

Note that the host apparatus 100 includes a computer such as a personal computer (including a tablet-type terminal) and the like. The host apparatus 100 may include all the constituent elements 111 to 118 in one housing, or may include a plurality of separated devices capable of communicating with each other. Furthermore, even if the printer 200 may be included in the host apparatus 100, the present technology can be implemented.

The printer 200 illustrated in FIG. 1 may be an ink jet printer configured to discharge (eject) cyan (C) ink, magenta (M) ink, yellow (Y) ink, and black (K) ink as a color material from a recording head 220 to form an output image IM0 corresponding to print data. The recording head 220 is supplied with each of CMYK (cyan, magenta, yellow, and black) ink from ink cartridges Cc, Cm, Cy, Ck and discharges each of CMYK ink droplets 280 from nozzles Nc, Nm, Ny, Nk. The ink droplets 280 land on a print substrate ME1 and thus, ink dots form on the print substrate ME1. Thus, a printed article having the output image IM0 on the print substrate ME1 is obtained.

2. Specific Example of Color Management System

Figure 2:
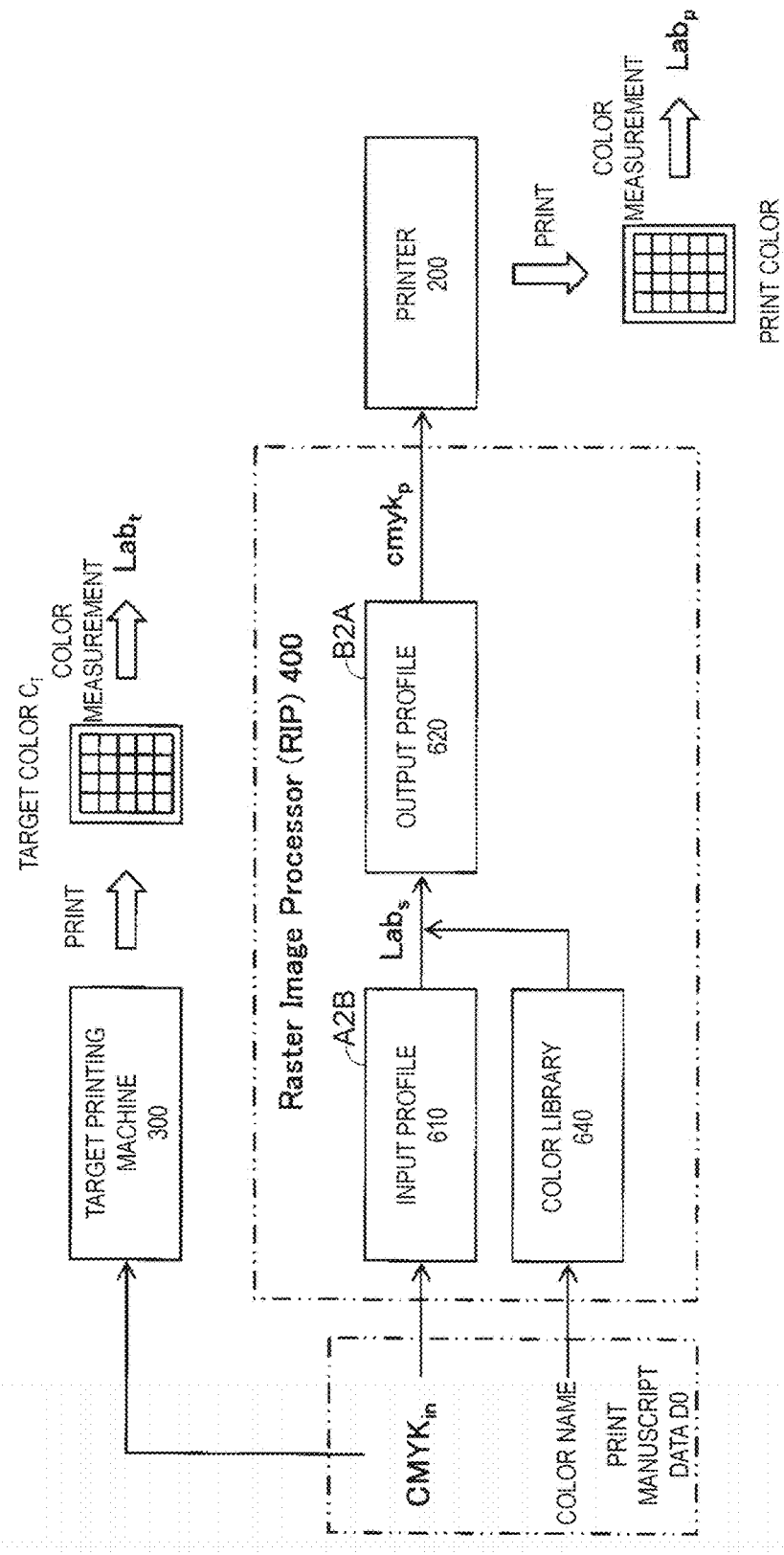
FIG. 2 schematically shows an example of a color management flow.

Next, an example of a color management system to which the present technology can be applied, will be described with reference to FIG. 2. FIG. 2 is a diagram schematically illustrating an example of a color management flow.

The color management system illustrated in FIG. 2 converts print manuscript data D0 into output data representing printing colors cmyk$_p$ (cyan, magenta, yellow, and black) by a Raster Image Processor (RIP) 400 to cause the printer 200 to form a printed article. The print manuscript data D0 represents process colors CMYK$_{in}$ for reproducing a target color (target color C$_t$) by CMYK ink (color material) of a target printing machine 300 that is an example of a color-matching target device. A color name of a color library may also be designated for the print manuscript data D0. For example, a Pantone (registered trademark) color library and the like can be used for the color library.

The target printing machine 300 may be an offset printing machine or may be a gravure printing machine, a flexo printing machine, or the like. The target color C$_t$ is represented, for example, by a CIELab color space coordinate value (Lab value). FIG. 2 illustrates a state where the target printing machine 300 prints a color chart representing the target color C$_t$ on the print substrate and the colorimetric device measures the color of each patch of the color chart to obtain a colorimetric value Lab$_t$. The process color CMYK$_{in}$ corresponds to a usage amount of CMYK ink used by the target printing machine 300 and represents a CMYK color space coordinate that depends on the target printing machine 300.

The RIP 400 includes the input profile 610, the output profile 620, and a color library 640. The input profile 610 is a file in which a color characteristic of ink used by the target printing machine 300 is described. The output profile 620 is a file in which a color characteristic of ink used by the printer 200 is described. For example, an ICC profile data format can be used for both profiles 610 and 620. The process color CMYK$_{in}$ of the print manuscript data D0 is converted into a color Lab$_s$ of the Lab color space in accordance with the input profile 610, and is converted into the printing colors cmyk$_p$ in accordance with the output profile 620. When the printer 200 uses ink of the total four CMYK colors, the printing colors cmyk$_p$ are output to the printer 200 for reproduction on the printed article. FIG. 2 illustrates a state where the printer 200 prints a color chart representing the printing colors cmyk$_p$ on the print substrate and the colorimetric device measures the color of each patch of the color chart to obtain a colorimetric value Lab$_p$. When the printer 200 also uses ink such as Lc (light cyan), Lm (light magenta), and Lk (light black), the RIP 400 or the printer 200 classify the printing colors cmyk$_p$ into dark colors and light colors, and then the printer 200 can reproduce the printing colors cmyk$_p$ on the printed article. Needless to say, the printing colors are also not limited to the four CMYK colors.

Furthermore, when a color name is configured in the print manuscript data D0, the RIP 400 may convert the color name into a color Lab$_s$ of the Lab color space with reference to the color library 640.

Note that the RIP 400 also has an input profile for conversion of, other than the process colors CMYK$_{in}$, process colors such as process colors (hereinafter, CMY$_{in}$) representing usage amounts of the color materials of only the three primary colors CMY providing subtractive mixed colors, and process colors (hereinafter, RGB$_{in}$) representing an intensity of the three primary colors red (R), green (G), and blue (B) providing additive mixed colors and the Lab color space coordinate value. Thus, the RIP 400 can also convert the process colors CMY$_{in}$, the process colors RGB$_{in}$, and the like, into the printing colors cmyk$_p$ via the Lab color space. Additionally, the RIP 400 can also input the color Lab$_s$ of the Lab color space for conversion to the printing colors cmyk$_p$.

Thus, the printer 200 can reproduce a color close to the color of the target printing machine 300. However, in actuality, an expected color may not be reproduced due to a profile error, a color measurement error, a fluctuation of the printer, or the like. In such a case, a conversion accuracy of a subject color is increased by correcting the profiles 610 and 620. When correcting the output profile 620, it is conceivable to set an Lab$_s$ value in the Profile Connection Space (PCS) as a target value, set a result of a color measurement of a color printed by the printer 200 (Lab$_p$) as a current value, calculate a color difference between the target value and the current value, and correct the output profile 620 so that the color difference is small. Furthermore, when correcting the input profile 610, it is conceivable to convert data of a color chart by the input profile 610 and the output profile 620 to print the color chart, calculate a color difference between a colorimetric result of each patch (Lab$_p$) and a target color value (Lab$_t$), and correct the input profile 610 so that the color difference is small.

However, due to the reasons below, an expected color may not be obtained or great care may be required.

Reason 1: Color measurement needs to be performed on a printed result and thus, a measurement device is necessary, and adaption to a color matching through visual observation is not possible.

Reason 2: When correcting the input profile 610, the calculation result of the color difference is used as feedback for the input profile 610. However, in a case in which an error cause would be in the output profile 620, another input profile also needs to be corrected. (In this case, the calculation result is provided as feedback for the output profile 620 to correct the output profile 620, and thus, the other output profile does not need to be corrected)

In the present specific example, as illustrated in FIG. 1, work convenience in the adjustment of the profile that is used in the conversion of the color space coordinate value is improved by the functions FU1 to FU7, FUA, FUB, and FUC to be realized by the profile adjustment program PR0, and thus, even higher color reproduction accuracy and gradation can be realized.

3. Specific Example of Profile

Figure 3:
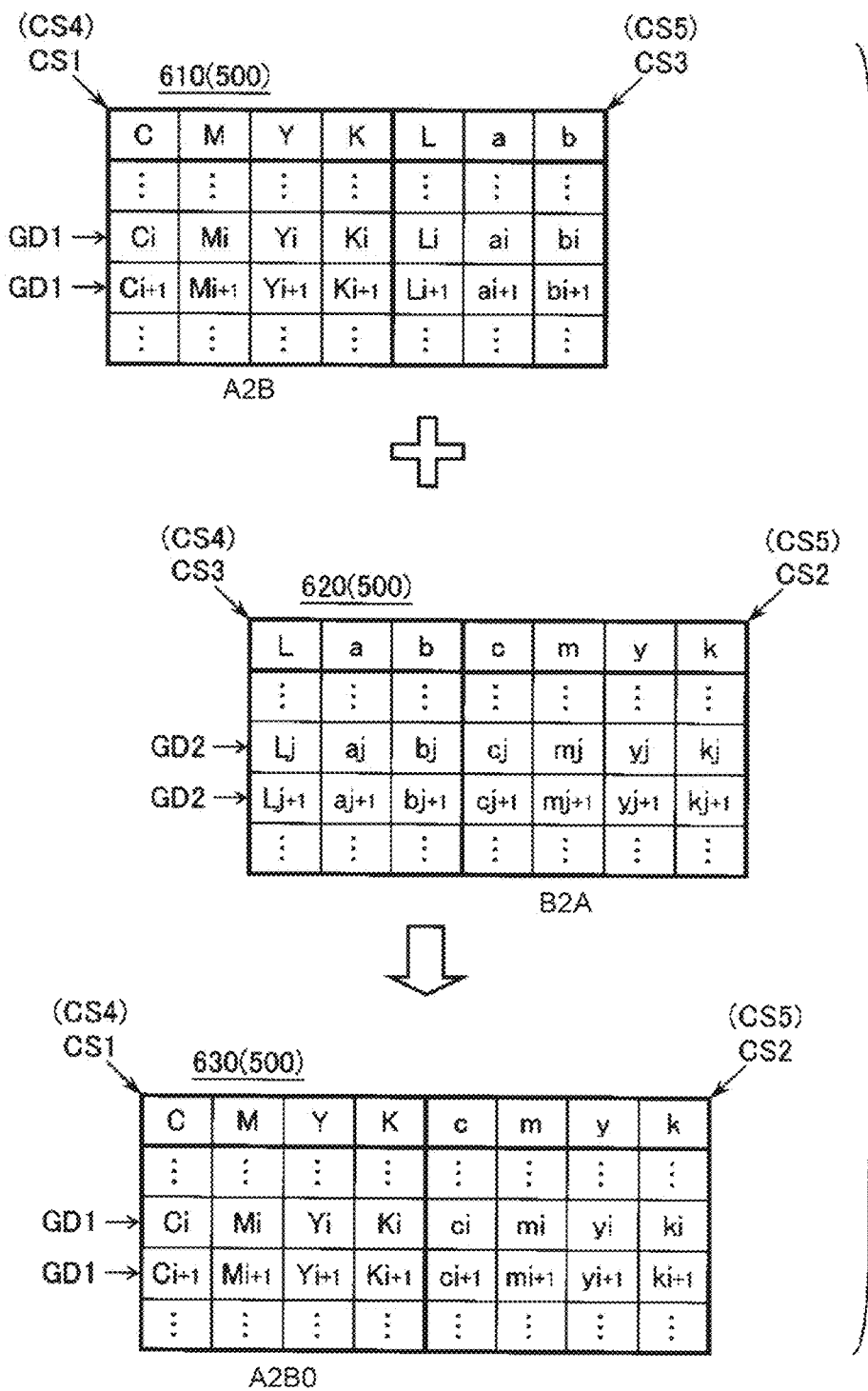
FIG. 3 schematically shows an example of a relationship of various types of profiles.

FIG. 3 is a diagram schematically illustrating an example of a relationship of various types of profiles and schematically illustrates a relationship of the profiles 610, 620, and 630 illustrated in FIG. 1.

As illustrated in FIG. 3, the input profile 610 is data specifying a correspondence relationship between a CMYK value (C$_i$, M$_i$, Y$_i$, K$_i$) of a CMYK color space (an example of a first color space CS1) matched with the ink used by the target printing machine 300 and an Lab value (L$_i$, a$_i$, b$_i$) of an Lab color space (an example of Profile Connection Space (PCS) CS3). In this case, lattice points GD1 in an A2B table are usually aligned at nearly equal intervals in a C-axis direction, an M-axis direction, a Y-axis direction, and a K-axis direction in the CMYK color space. Note that a variable i here is a variable for identifying the lattice points GD1 configured in the CMYK color space (CS1). The CMYK value is an example of a first coordinate value. The Lab value is an example of a third coordinate value. In the input profile 610, the CMYK color space (CS1) is an example of an input color space CS4 and the Lab color space (CS3) is an example of an output color space CS5.

The output profile 620 is data specifying a correspondence relationship between the Lab value ($L_j$, $a_j$, $b_j$) in the Lab color space (CS3) and the cmyk value ($c_j$, $m_j$, $y_j$, $k_j$) in the cmyk color space (an example of a second color space CS2) matched with the ink used by the printer 200. In this case, lattice points GD2 in a B2A table are usually aligned at nearly equal intervals in an L-axis direction, an a-axis direction, and a b-axis direction in the Lab color space. Note that a variable j here is a variable for identifying the lattice points GD2 configured in the Lab color space (CS3). The expression "cmyk color space" is used to distinguish the color space matched with the ink used by the printer 200 from the color space matched with the target printing machine 300. The cmyk value is an example of a second coordinate value. In the output profile 620, the Lab color space (CS3) is an example of the input color space CS4 and the cmyk color space (CS2) is an example of an output color space CS5.

The device link profile 630 is data specifying a correspondence relationship between the CMYK value ($C_i$, $M_i$, $Y_i$, $K_i$) in the CMYK color space (CS1) and the cmyk value ($c_i$, $m_i$, $y_i$, $k_i$) of the cmyk color space (CS2). Here, a variable i is a variable for identifying the lattice points GD1 configured for the CMYK color space (CS1). The device link profile 630 can be obtained by combining the input profile 610 and the output profile 620. In the device link profile 630, the CMYK color space (CS1) is an example of the input color space CS4 and the cmyk color space (CS2) is an example of the output color space CS5.

Figure 4:
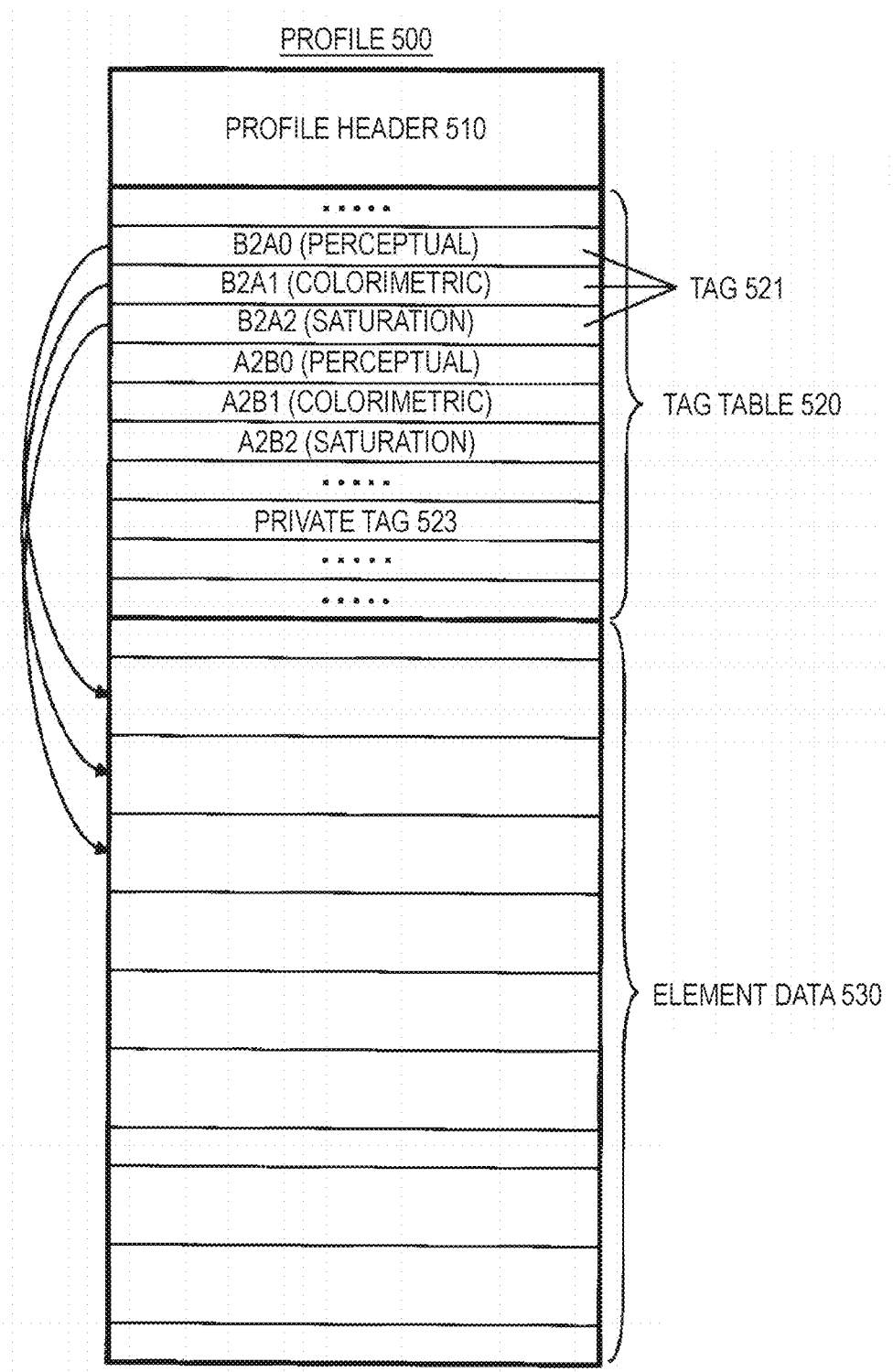
FIG. 4 schematically shows an example of a profile structure.

FIG. 4 is a diagram schematically illustrating an example of a profile structure and schematically illustrates an example of a structure of the profile 500.

The profile 500 illustrated in FIG. 4 is an ICC profile and includes a profile header 510 and a tag table 520. The profile 500 includes a tag 521 that is information necessary for converting color information between the PCS and a device-dependent color space. The tag 521 may include a private tag 523 for customizing the profile 500.

An A2Bx tag (where x is 0, 1, or 2 in FIG. 4) for the device (300, 200) includes, as element data 530, a color conversion table for conversion from the device-dependent color space (CMYK color space, cmyk color space) to the Lab color space. A B2Ax tag (where x is 0, 1, or 2 in FIG. 4) for the device (300, 200) includes, as the element data 530, a color conversion table for conversion from the Lab color space to the device-dependent color space (CMYK color space, cmyk color space).

An A2B0 tag and a B2A0 tag illustrated in FIG. 4 are information for performing a perceptual color conversion. The perceptual color conversion focuses on tone reproduction and thus, is mainly used for conversion of a photographic image with a wide color gamut. An A2B1 tag and a B2A1 tag illustrated in FIG. 4 are information for performing a Media Relative Colorimetric color conversion or an Absolute Colorimetric color conversion. The colorimetric color conversion is faithful to a colorimetric value and thus, is mainly used for the conversion for color proof output of digital proof that requires accurate color consistency. An A2B2 tag and a B2A2 tag illustrated in FIG. 4 are information for performing a Saturation color conversion. The Saturation color conversion focuses more on color vividness than on color accuracy and thus, is mainly used for the conversion of graph displays and the like in business graphics.

Figure 5:
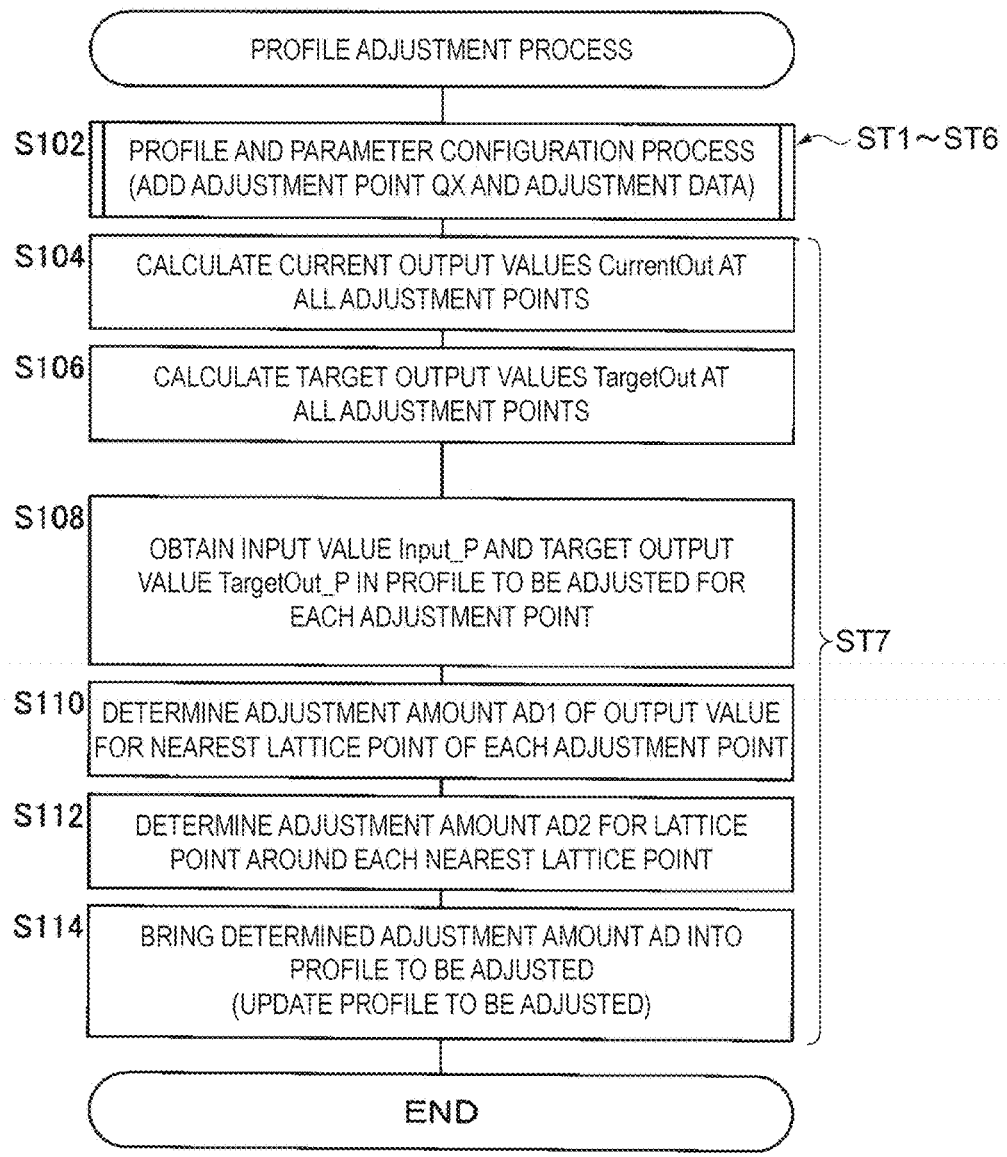
FIG. 5 shows a flowchart illustrating an example of a profile adjustment process.
Figure 6:
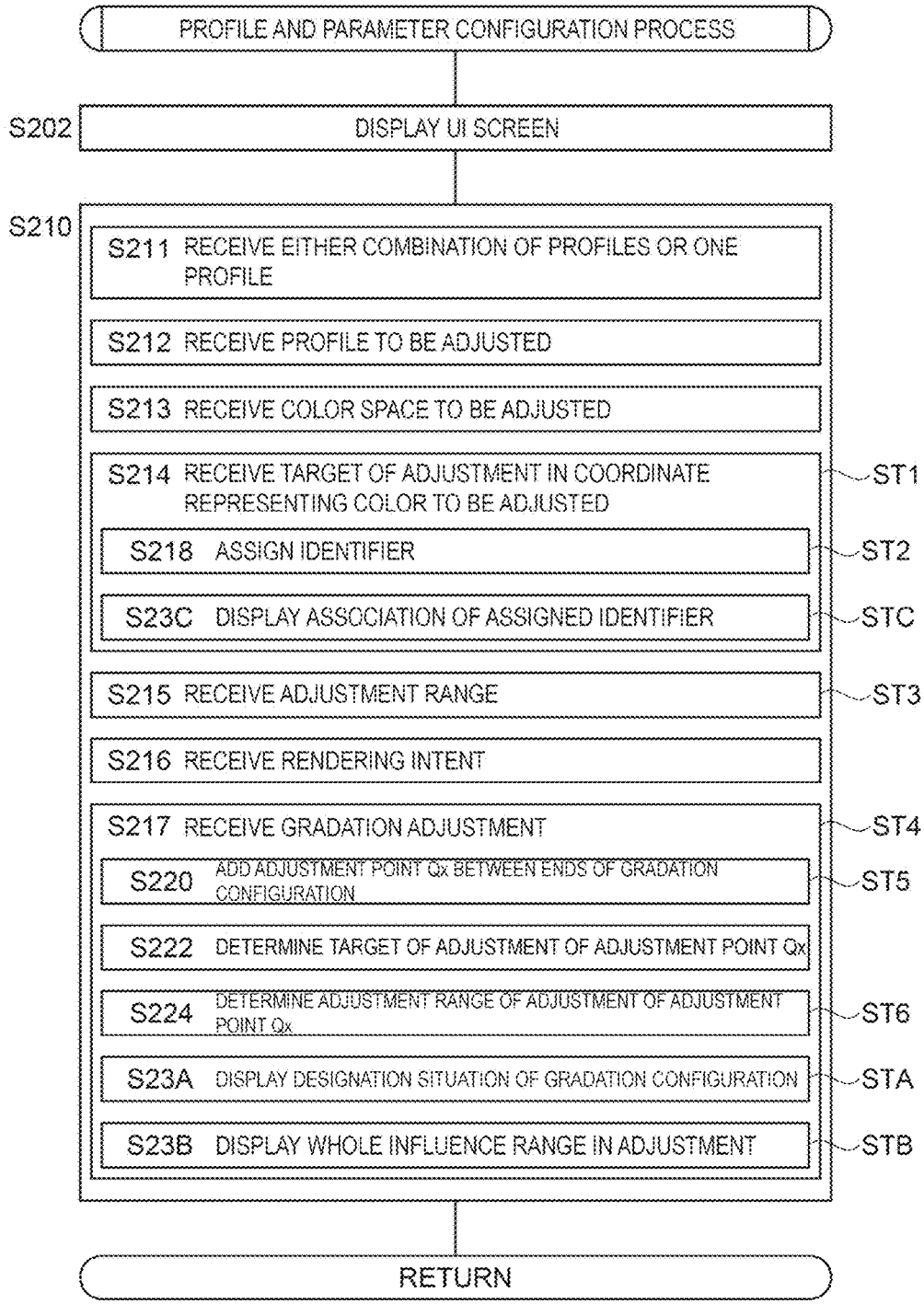
FIG. 6 shows a flowchart illustrating an example of a profile and parameter configuration process.
Figure 7:
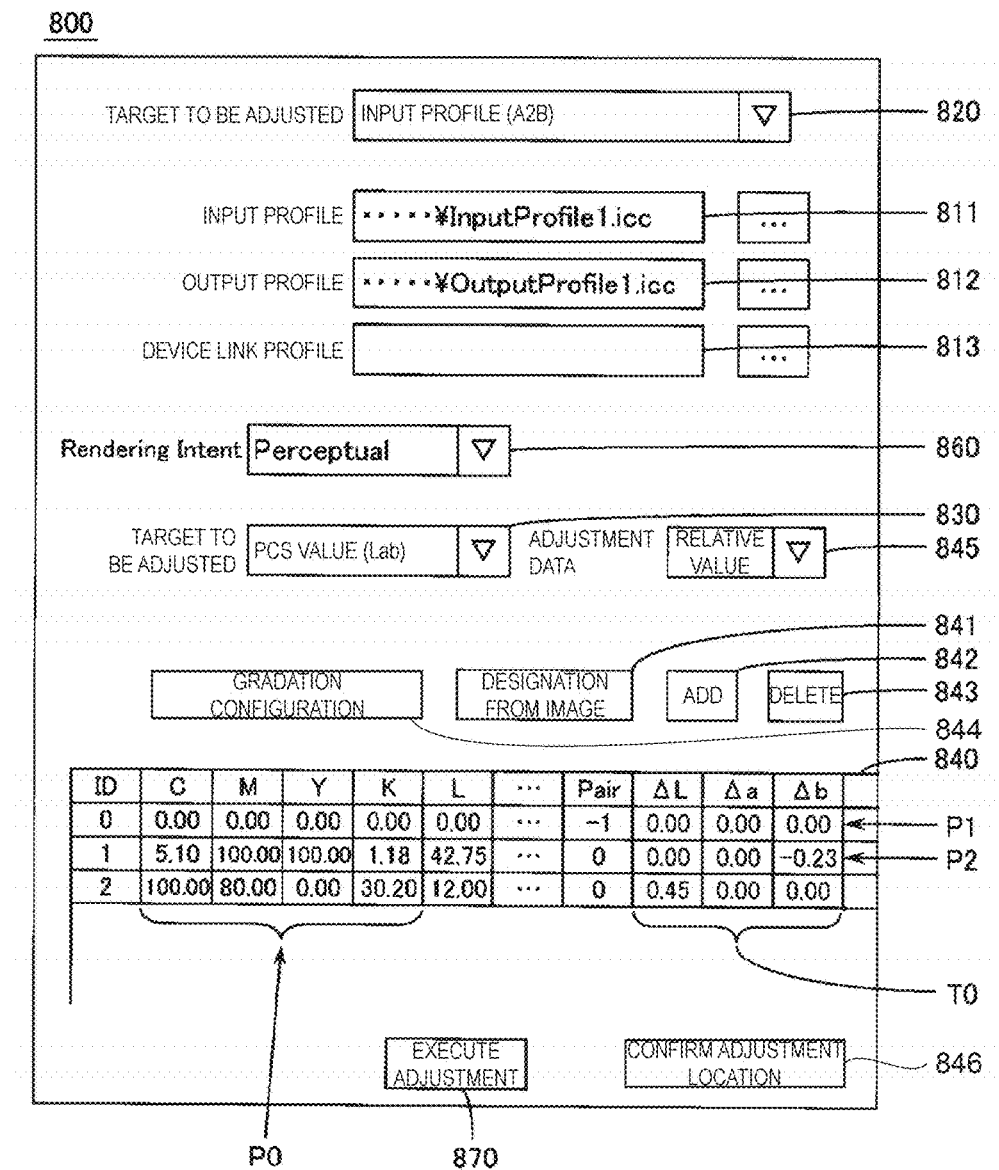
FIG. 7 schematically shows an example of a user interface screen.

4. Specific Example of Profile Adjustment Process Performed in Profile Adjustment System FIG. 5 is a flowchart illustrating an example of a profile adjustment process and illustrates an example of the profile adjustment process performed by the host apparatus 100 illustrated in FIG. 1. FIG. 6 is a flowchart illustrating an example of a profile and parameter configuration process and illustrates an example of a profile and parameter configuration process to be performed in step S102 in FIG. 5. Needless to say, these processes can be modified appropriately by changing the order and the like. FIG. 7 is a diagram schematically illustrating an example of a user interface screen and illustrates an example of a user interface (UI) screen 800 to be displayed in step S202 in FIG. 6.

The host apparatus 100 performs a plurality of processes in parallel in multitasking manner. Here, in step S214 in FIG. 6, an input field for a coordinate of an adjustment point provided on the color space is displayed in the display unit and step S214 corresponds to an adjustment coordinate reception step ST1 for receiving the coordinate configuration of the adjustment point and to the adjustment coordinate reception function FU1 and an adjustment coordinate reception unit U1 in FIG. 1. Step S218 in FIG. 6 corresponds to an identifier assignment step ST2 and to the identifier assignment function FU2 and an identifier assignment unit U2 in FIG. 1. In step S215 in FIG. 6, an input field for an adjustment influence range of the adjustment point provided on the color space is displayed in the display unit and step S215 corresponds to an adjustment influence range reception step ST3 for receiving an adjustment influence range configuration of the adjustment point and to the adjustment influence range reception function FU3 and an adjustment influence range reception unit U3 in FIG. 1. In step S217 in FIG. 6, an input field of the linking configuration between each of at least two adjustment points configured in the adjustment coordinate reception step ST1 and the adjustment influence range reception step ST3 is displayed in the display unit and step S217 corresponds to a linking configuration reception step ST4 of receiving the linking configuration between each of the adjustment points as needed, and to the linking configuration reception function FU4 and a linking configuration reception unit U4 in FIG. 1. Step S220 in FIG. 6 corresponds to an adjustment coordinate configuration step ST5 of configuring a coordinate of a new adjustment point between each of the adjustment points configured in the linking configuration reception step ST4, and to the adjustment coordinate configuration function FU5 and an adjustment coordinate configuration unit U5 in FIG. 1. Step S224 in FIG. 6 corresponds to an adjustment influence range configuration step ST6 of configuring an adjustment influence range for the new adjustment point configured in the adjustment coordinate configuration step ST5, and to the adjustment influence range configuration function FU6 and an adjustment influence range configuration unit U6 in FIG. 1. Step S23A in FIG. 6 corresponds to a linking configuration display processing step STA of displaying, in the display unit, a linking configuration condition configured in the linking configuration reception step ST4, and to the linking configuration display processing function FUA and a linking configuration display processing unit UA in FIG. 1. Step S23B in FIG. 6 corresponds to a whole adjustment influence range display processing step STB of displaying, in the display unit, a whole adjustment influence range including the adjustment influence range reception step ST3, the linking configuration reception step ST4, the adjustment coordinate configuration step ST5, and the adjustment influence range configuration step ST6, and to the whole adjustment influence range display processing function FUB and a whole adjustment influence range display processing unit UB in FIG. 1. Step S23C in FIG. 6 corresponds to an identifier display processing step STC and to the identifier display processing function FUC and an identifier display processing unit UC in FIG. 1. Steps S104 to S114 in FIG. 5 correspond to a profile adjustment step ST7 of adjusting the profile based on all adjustment points configured in the adjustment coordinate reception step ST1 and the adjustment point added in the adjustment coordinate configuration step ST5 and to the profile adjustment function FU7 and a profile adjustment unit U7 in FIG. 1. Hereinafter, the word "step" is omitted.

When the profile adjustment process illustrated in FIG. 5 is started, the host apparatus 100 performs the profile and parameter configuration process illustrated in FIG. 6 (S102). When the profile and parameter configuration process is started, the host apparatus 100 displays the UI screen 800 illustrated in FIG. 7 on the display device 115 being the display unit (S202 in FIG. 6). The UI screen 800 includes a field for selecting an input profile 811, a field for selecting an output profile 812, a field for selecting a device link profile 813, a field for designating a profile to be adjusted 820, a field for selecting a color space to be adjusted 830, a target reception region 840, a designation from image button 841, an addition button 842, a deletion button 843, a button for configuring a gradation 844, a field for selecting adjustment data 845, a button for confirming an adjustment location 846, a field for designating an intent 860, and a button for executing an adjustment 870.

The host apparatus 100 receives, by the input device 116, operations on the above-mentioned fields and buttons (S210) and terminates the profile and parameter configuration process when receiving an operation on the button for executing an adjustment 870. The process S210 includes the following processes S211 to S224, S23A, S23B, and S23C.

In S211, a process is performed for receiving any one selection of a combination of profiles used for a conversion from the CMYK value to the cmyk value and one profile as the profile to be adjusted 550 used for the conversion from the CMYK value to the cmyk value.

In S212, a process is performed for receiving any one from among the profiles 610, 620, and 630, as the profile to be adjusted 550.

In S213, a process is performed for receiving, as a color space to be adjusted CS6, any one color space from among two or more types of color spaces from among the CMYK color space (CS1), the cmyk color space (CS2), and the Lab color space (CS3).

In S214, a process is performed for receiving a coordinate representing an adjustment point P0 (example of a color to be adjusted) and an input of an adjustment target T0 in the coordinate.

In S215, a process is performed for receiving a designation of an adjustment influence range R0 in which adjustment is performed based on a target T0 from among the profiles to be adjusted 550 in the CMYK color space (CS1).

In S216, a process is performed for receiving, as a designation intent, any one from among a plurality of rendering intents for specifying a correspondence relationship of the profile to be adjusted 550.

In S217, a process is performed for receiving a linking configuration between a plurality of designated adjustment points $P_n$.

In S218, a process is performed for assigning an identifier to the adjustment point P0.

In S220, a process is performed for generating a new adjustment point $Q_x$ between an end point (first adjustment point P1) and an end point (second adjustment point P2) for which the linking configuration has been provided in S217.

In S222, a process is performed for assigning an adjustment target $T_x$ to the new adjustment point $Q_x$ generated in S220.

In S224, a process is performed for assigning an adjustment influence range $R_x$ to the new adjustment point $Q_x$ generated in S220.

In S23A, a process is performed for displaying a linking configuration condition between any adjustment points $P_n$ on the display device 115.

In S23B, a process is performed for displaying, on the display device 115, a region included in whole adjustment influence range in an overlapping manner on any displayed images.

In S23C, a process is performed for displaying the identifier assigned to the adjustment point P0 in S218, in a state associated with the adjustment point P0, on the display device 115.

Figure 8A:
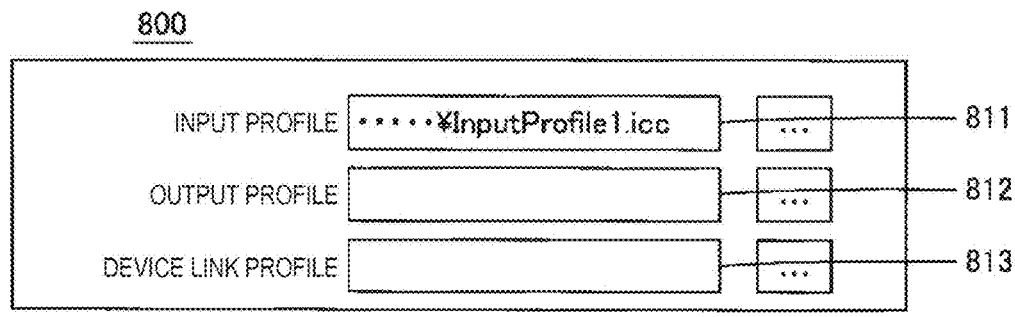
FIG. 8A schematically shows an example in which one input profile is received.
Figure 8B:
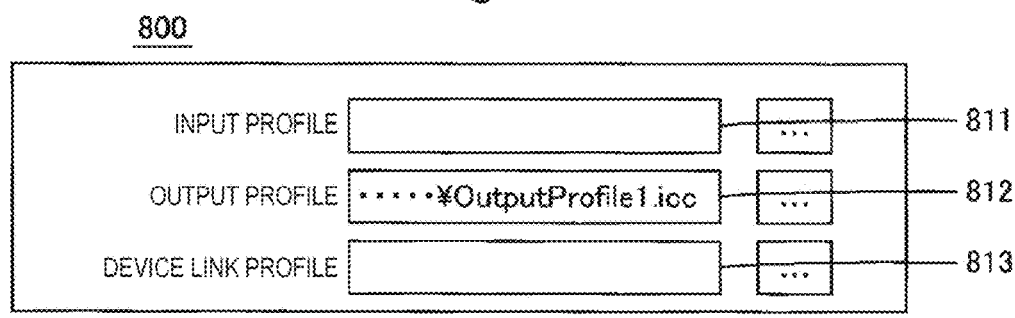
FIG. 8B schematically shows an example in which one output profile is received.
Figure 8C:
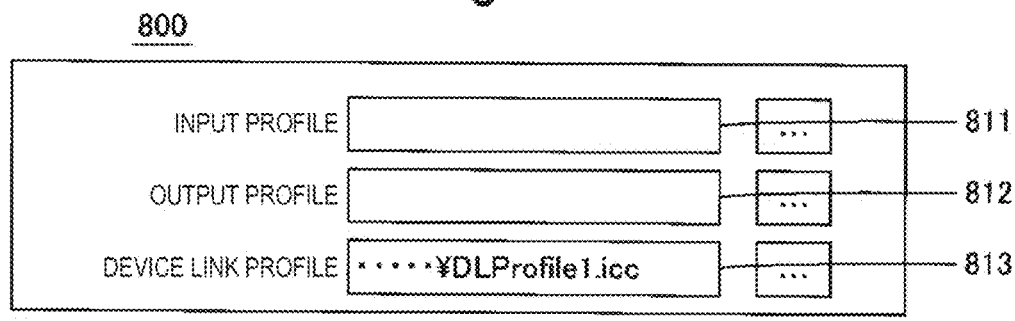
FIG. 8C schematically shows an example in which one device link profile is received.
Figure 8D:
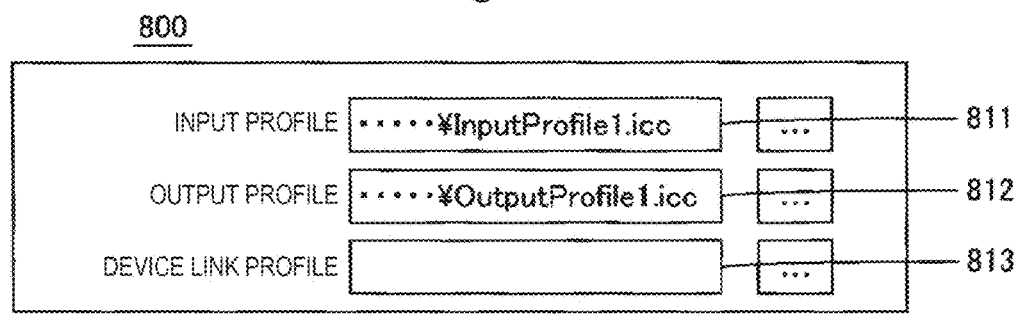
FIG. 8D schematically shows an example in which a combination of an input profile and an output profile is received.

First, a process of S211 will be described with reference to FIG. 7, FIGS. 8A to 8D, and the like. Note that FIG. 8A is a diagram schematically illustrating an example of receiving one input profile. FIG. 8B is a diagram schematically illustrating an example of receiving one output profile. FIG. 8C is a diagram schematically illustrating an example of receiving one device link profile. FIG. 8D is a diagram schematically illustrating an example of receiving a combination of an input profile and an output profile.

The host apparatus 100 receives an operation for selecting a profile from among the profiles 500 stored in the storage device 114, by receiving operations on the selection fields 811 to 813 by the input device 116.

When using the input profile 610 for the color conversion, it is possible to select, in the field for selecting an input profile 811, an input profile used for the color conversion from among the input profiles 610 stored in the storage device 114. When the input profile 610 is not used for the color conversion, the field for selecting an input profile 811 may be blank.

When using the output profile 620 for the color conversion, it is possible to select, in the field for selecting an output profile 812, an output profile used for the color conversion from among the output profiles 620 stored in the storage device 114. When the output profile 620 is not used for the color conversion, the field for selecting an output profile 812 may be blank.

When using the device link profile 630 for the color conversion, it is possible to select, in the field for selecting a device link profile 813, a device link profile used for the color conversion from among the device link profiles 630 stored in the storage device 114. When the device link profile 630 is not used for the color conversion, the field for selecting a device link profile 813 may be blank.

As illustrated in FIG. 8A, when the input profile 610 is selected only in the field for selecting an input profile 811, only the input profile 610 is used for the color conversion and the input profile 610 automatically becomes the profile to be adjusted 550. In this case, the CMYK value falls into the first coordinate value and the Lab value falls into the second coordinate value.

As illustrated in FIG. 8B, when the output profile 620 is selected only in the field for selecting an output profile 812, only the output profile 620 is used for the color conversion and the output profile 620 automatically becomes the profile to be adjusted 550. In this case, the Lab value falls into the first coordinate value and the cmyk value falls into the second coordinate value.

As illustrated in FIG. 8C, when the device link profile 630 is selected only in the field for selecting a device link profile 813, the device link profile 630 is used for the color conversion and the device link profile 630 automatically becomes the profile to be adjusted 550. In this case, the CMYK value falls into the first coordinate value and the cmyk value falls into the second coordinate value.

As illustrated in FIG. 8D, when the input profile 610 is selected in the field for selecting an input profile 811 and the output profile 620 is further selected in the field for selecting an output profile 812, the input profile 610 and the output profile 620 are combined to be used for the color conversion. In this case, the CMYK value falls into the first coordinate value and the cmyk value falls into the second coordinate value.

Consequently, any one of the combination of profiles used for the color conversion and the one profile used for the color conversion as the profile to be adjusted 550 can be selected in the selection fields 811 to 813.

Figure 9A:
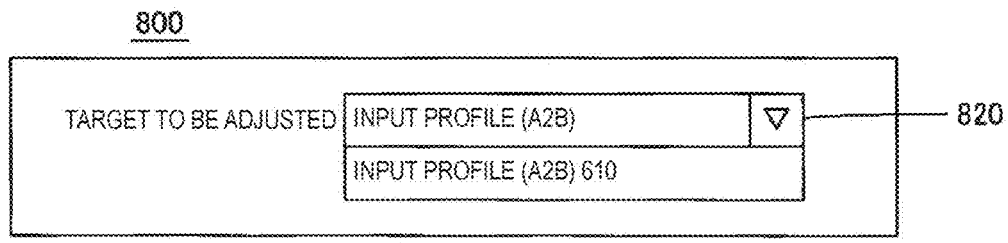
FIG. 9A schematically shows an example in which a profile to be adjusted is received with one input profile already received.
Figure 9B:
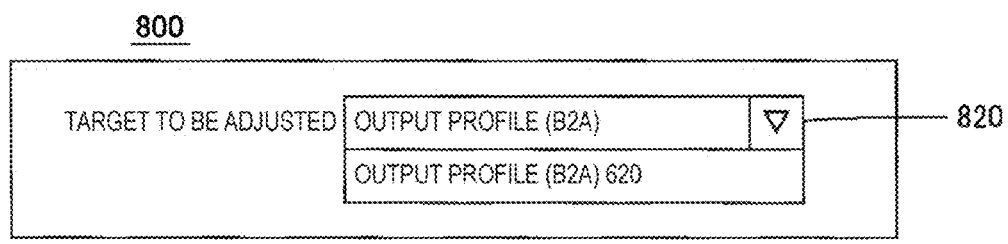
FIG. 9B schematically shows an example in which a profile to be adjusted is received with one output profile already received.
Figure 9C:
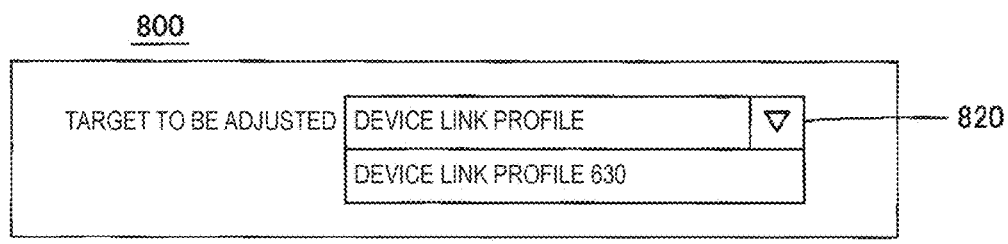
FIG. 9C schematically shows an example in which a profile to be adjusted is received with one device link profile already received.
Figure 9D:
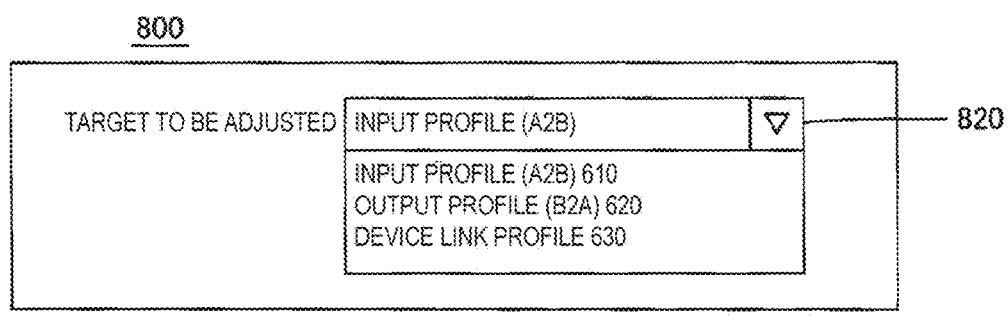
FIG. 9D schematically shows an example in which a profile to be adjusted is received with a combination of an input profile and an output profile already received.

Next, a process of S212 will be described with reference to FIG. 7, FIGS. 9A to 9D, and the like. Note that FIG. 9A is a diagram schematically illustrating an example in which a profile to be adjusted is received with one input profile already received. FIG. 9B is a diagram schematically illustrating an example in which a profile to be adjusted is received with one output profile already received. FIG. 9C is a diagram schematically illustrating an example in which a profile to be adjusted is received with one device link profile already received. FIG. 9D is a diagram schematically illustrating an example in which a profile to be adjusted is received with a combination of an input profile and an output profile already received.

The host apparatus 100 performs a process of changing a designation item in the field for designating a profile to be adjusted 820 in accordance with the selection in the above-described selection fields 811 to 813.

When the input profile 610 is selected only in the field for selecting an input profile 811, as illustrated in FIG. 8A, only the input profile 610 can be designated for the adjustment target in the field for designating a profile to be adjusted 820, as illustrated in FIG. 9A.

When the output profile 620 is selected only in the field for selecting an output profile 812, as illustrated in FIG. 8B, only the output profile 620 can be designated for a profile to be adjusted in the field for designating a profile to be adjusted 820, as illustrated in FIG. 9B.

When the device link profile 630 is selected only in the field for selecting a device link profile 813, as illustrated in FIG. 8C, only the device link profile 630 can be designated for a profile to be adjusted in the field for designating a profile to be adjusted 820, as illustrated in FIG. 9C.

When the input profile 610 is selected in the field for selecting an input profile 811 and the output profile 620 is further selected in the field for selecting an output profile 812, as illustrated in FIG. 8D, any one designation item can be selected from among a plurality of designation items in the field for designating a profile to be adjusted 820, as illustrated in FIG. 9D. The plurality of designation items include the input profile 610, the output profile 620, and the device link profile 630. FIG. 9D illustrates a state where the input profile 610 is selected.

Note that, as illustrated in FIG. 9D, the field for designating a profile to be adjusted 820 includes all the time the input profile 610, the output profile 620, and the device link profile 630, and effectiveness or ineffectiveness of the selection operation on the designation item of the field for designating a profile to be adjusted 820 may be controlled in accordance with the designation condition in the field for selecting an input profile 811, the field for selecting an output profile 812, and the field for selecting a device link profile 813.

Consequently, when the combination of the input profile 610 and the output profile 620 is selected, any one from among the profiles 610, 620, and 630 is selected in the field for designating a profile to be adjusted 820 as the profile to be adjusted 550.

Note that any of the input profile 610, the output profile 620, and the device link profile 630 can be selected as a profile to be adjusted in the field for designating a profile to be adjusted 820, and whether the operation on the above-described selection fields 811 to 813 is valid or invalid, may be controlled in accordance with the selection.

Figure 10A:
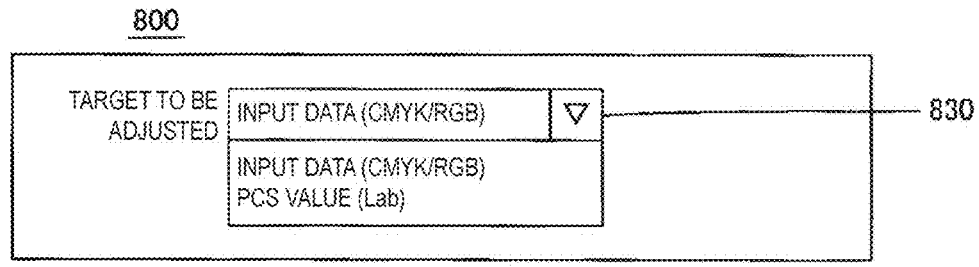
FIG. 10A schematically shows an example in which a color space to be adjusted is received with one input profile already received.
Figure 10B:
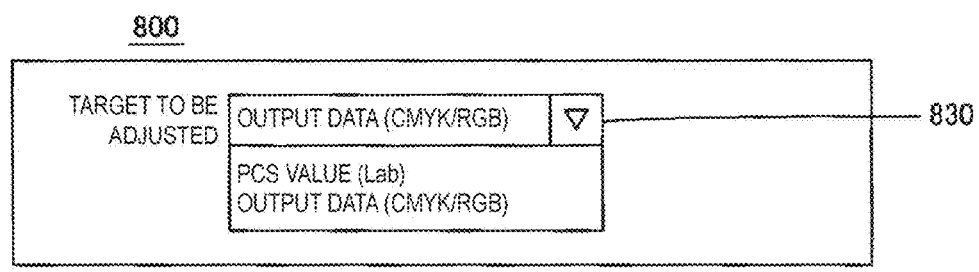
FIG. 10B schematically shows an example in which a color space to be adjusted is received with one output profile already received.
Figure 10C:
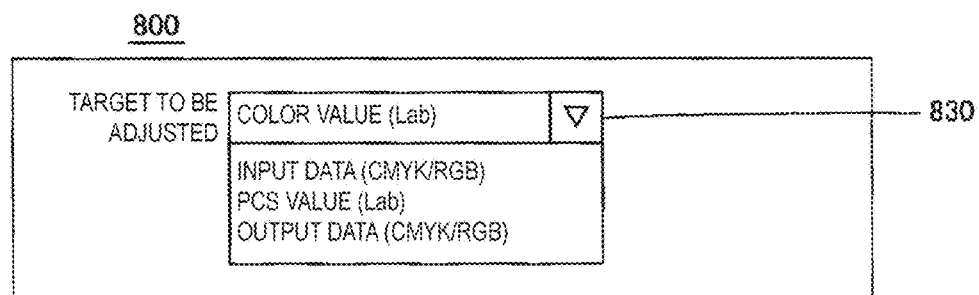
FIG. 10C schematically shows an example in which a color space to be adjusted is received with one device link profile or a combination of an input profile and an output profile already received.

A process of S213 will be described with reference to FIG. 7, FIGS. 10A to 10C, and the like. Note that FIG. 10A is a diagram schematically illustrating an example in which a color space to be adjusted is received with one input profile already received. FIG. 10B is a diagram schematically illustrating an example in which a color space to be adjusted is received with one output profile already received. FIG. 10C is a diagram schematically illustrating an example in which a color space to be adjusted is received with one device link profile or a combination of an input profile and an output profile already received.

The host apparatus 100 performs a process of changing a selection item in the field for selecting a color space to be adjusted 830 in accordance with a selection in the above-described selection fields 811 to 813.

When the input profile 610 is selected only in the field for selecting an input profile 811, as illustrated in FIG. 8A, one selection item can be designated from among a plurality of selection items in the field for selecting a color space to be adjusted 830, as illustrated in FIG. 10A. In this case, the plurality of selection items include "input data" and a "PCS value". The "input data" is an item for selecting the CMYK color space (an example of the first color space CS1 and the input color space CS4) as the color space to be adjusted CS6. Although not illustrated, the "PCS value" is an item for selecting the Lab color space (an example of the third color space CS3 and the output color space CS5) as the color space to be adjusted CS6.

When the output profile 620 is selected only in the field for selecting an output profile 812, as illustrated in FIG. 8B, one selection item can be designated from among the plurality of selection items in the field for selecting a color space to be adjusted 830, as illustrated in FIG. 10B. In this case, the plurality of selection items include the "PCS value" and "output data". The "PCS value" is an item for selecting the Lab color space (an example of the third color space CS3 and the input color space CS4) as the color space to be adjusted CS6. Although not illustrated, the "output data" is an item for selecting the cmyk color space (an example of the second color space CS2 and the output color space CS5) as the color space to be adjusted CS6.

When the input profile 610 is selected in the field for selecting an input profile 811 and the output profile 620 is further selected in the field for selecting an output profile 812, as illustrated in FIG. 8D, any one selection item can be designated from among the plurality of selection items in the field for selecting a color space to be adjusted 830, as illustrated in FIG. 10C. In this case, the plurality of selection items include the "input data", the "output data", and the "PCS value". The "input data" is an item for selecting the CMYK color space (an example of the first color space CS1 and the input color space CS4 in the input profile 610) as the color space to be adjusted CS6. The "output data" is an item for selecting the cmyk color space (an example of the second color space CS2 and the output color space CS5 in the output profile 620) as the color space to be adjusted CS6. Although not illustrated, the "PCS value" is an item for selecting the Lab color space (an example of the third color space CS3, the output color space CS5 in the input profile 610, and the input color space CS4 in the output profile 620) as the color space to be adjusted CS6.

Also, when the device link profile 630 is selected only in the field for selecting a device link profile 813, as illustrated in FIG. 8C, any one of the "input data", the "output data", and the "PCS value" can be designated in the field for selecting a color space to be adjusted 830, as illustrated in FIG. 10C.

Consequently, any one color space from among two or more types of color spaces from among the CMYK color space (CS1), the cmyk color space (CS2), and the Lab color space (CS3) is selected as the color space to be adjusted CS6.

Figure 11A:
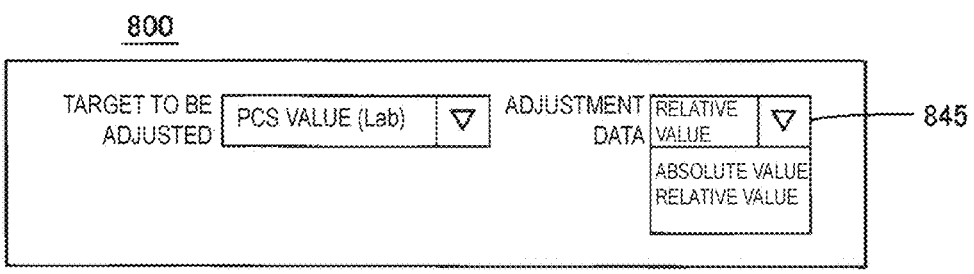
FIG. 11A schematically shows an example in which a method of inputting an adjustment target is received.
Figures 11B, 11C:
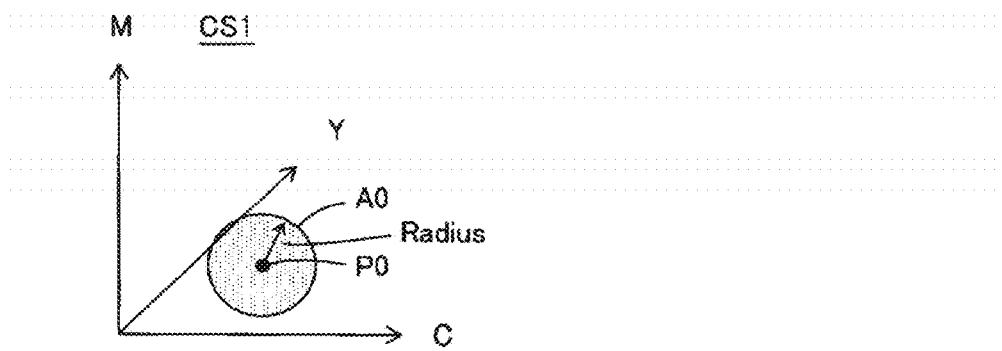
FIG. 11B schematically shows an example of a UI screen when receiving the adjustment target as a coordinate value of a color space.
FIG. 11C schematically shows an example in which an adjustment point is configured.

A process of S214 will be described with reference to FIG. 7, FIGS. 11A to 11C, and the like. Note that FIG. 11A is a diagram schematically illustrating an example in which a method of inputting an adjustment target is received. FIG. 11B is a diagram schematically illustrating an example of a UI screen when receiving an adjustment target as the coordinate value of the color space. FIG. 11C is a diagram schematically illustrating an example in which an adjustment point is configured.

The host apparatus 100 performs a process of changing an input item in the target reception region 840 in accordance with a selection in the above-described fields 811 to 813 and 830. Furthermore, the host apparatus 100 performs a process of changing an input item in the target reception region 840 in accordance with a selection in the field for selecting adjustment data 845.

As illustrated in FIG. 11A, any one of an "absolute value" and a "relative value" can be selected in the field for selecting adjustment data 845. The "absolute value" is an option for receiving an adjustment target T0 as a coordinate value of the color space. The "relative value" is an option for receiving the adjustment target T0 as a difference from a current coordinate value of the color space.

When the "absolute value" is selected in the field for selecting adjustment data 845, a display field of a current coordinate value (C_L, C_a, C_b) of the color space and an input field of a coordinate value (T_L, T_a, T_b) of the adjustment target T0 are displayed in the target reception region 840, as illustrated in FIG. 11B. FIG. 11B illustrates an example in which the Lab color space is selected for the color space to be adjusted CS6. Needless to say, the CMYK color space or the cmyk color space may be selected as the color space to be adjusted CS6.

When the "relative value" is selected in the field for selecting adjustment data 845, an input field of the coordinate value (ΔL, Δa, Δb) of the adjustment target T0 is displayed, as the difference from the current coordinate value of the color space, in the target reception region 840, as illustrated in FIG. 7. FIG. 7 illustrates an example in which the Lab color space is selected for the color space to be adjusted CS6. Needless to say, the CMYK color space or the cmyk color space may be selected as the color space to be adjusted CS6.

As illustrated in FIG. 11C, the adjustment point P0 for configuring the adjustment target T0 is configured in the CMYK color space (CS1). Here, the CMYK color space is a four-dimensional color space and thus, FIG. 11C illustrates a three-dimensional virtual space formed by a C-axis, an M-axis, and a Y-axis.

For example, when receiving an operation on the designation from image button 841 of the UI screen 800 illustrated in FIGS. 7 and 11B, the host apparatus 100 displays a screen schematically representing the CMYK color space (CS1) on the display device 115, and obtains the CMYK value in accordance with the operation by the input device 116 to update information in the target reception region 840. When a new adjustment point P0 is designated, the host apparatus 100 assigns an identifier corresponding to the adjustment point P0 by performing S218 described later and adapts the obtained CMYK value, the coordinate value of the output color space CS5 derived from the CMYK value, and the like, to the identifier for display in the target reception region 840. When an operation is performed on the addition button 842, the host apparatus 100 adds the identifier and increases the number of input fields in accordance with the added identifier in the target reception region 840. When an operation is performed on the deletion button 843, the host apparatus 100 receives a designation of the identifier to be deleted and deletes the input field corresponding to the designated identifier.

The adjustment target T0 received in the target reception region 840 changes as described below in accordance with a selection content in the field for selecting a color space to be adjusted 830 and a selection content in the field for selecting adjustment data 845.

Selection content 1: a case where the CMYK color space is selected as the color space to be adjusted CS6 and the "absolute value" is selected for the input of the adjustment target T0. In this case, the input of the adjustment target T0 is the CMYK value (T_C, T_M, T_Y, T_K). The CMYK value is represented by from 0 to 100%, for example.

Selection content 2: a case where the CMYK color space is selected as the color space to be adjusted CS6 and the "relative value" is selected for the input of the adjustment target T0. In this case, the input of the adjustment target T0 is a difference (ΔC, ΔM, ΔY, ΔK) of the target value (T_C, T_M, T_Y, T_K) from the current value of the CMYK value (C_C, C_M, C_Y, C_K).

Selection content 3: a case where the Lab color space is selected as the color space to be adjusted CS6 and the "absolute value" is selected for the input of the adjustment target T0. In this case, the input of the adjustment target T0 is the Lab value (T_L, Ta, T_b).

Selection content 4: a case where the Lab color space is selected as the color space to be adjusted CS6 and the "relative value" is selected for the input of the adjustment target T0. In this case, the input of the adjustment target T0 is a difference (ΔL, Δa, Δb) of the target value (T_L, T_a, T_b) from the current value of the Lab value (C_L, C_a, C_b).

Selection content 5: a case where the cmyk color space is selected as the color space to be adjusted CS6 and the "absolute value" is selected for the input of the adjustment target T0. In this case, the input of the adjustment target T0 is the cmyk value (T_c, T_m, T_y, T_k). The cmyk value is represented by from 0 to 100%, for example.

Selection content 6: a case where the cmyk color space is selected as the color space to be adjusted CS6 and the "relative value" is selected for the input of the adjustment target T0. In this case, the input of the adjustment target T0 is a difference ($\Delta c$, $\Delta m$, $\Delta y$, $\Delta k$) of the target value ($T\_c$, $T\_m$, $T\_y$, $T\_k$) from the current value of the cmyk value ($C\_c$, $C\_m$, $C\_y$, $C\_k$).

Consequently, the adjustment target T0 in the coordinates representing the adjustment point P0 is received in the color space to be adjusted CS6.

Here, a plurality of adjustment points $P_n$ and targets $T_n$ in the adjustment points can be designated, and the target T0 in the first adjustment point P1 illustrated in FIGS. 7 and 11B is a first target T1 of an adjustment in the first adjustment point P1 and an example of first adjustment data representing an extent of the adjustment in the first adjustment point P1. The target T0 in the second adjustment point P2 illustrated in FIGS. 7 and 11B is a second target T2 of an adjustment in the second adjustment point P2 and is an example of second adjustment data representing an extent of the adjustment in the second adjustment point P2.

Consequently, the first target T1 and the second target T2 are configured.

A process of S215 will be described with reference to FIGS. 7, 11B, 11C, and the like.

As illustrated in FIG. 11B, the host apparatus 100 receives, in the input field "Radius" of the target reception region 840, an input of a radius having the adjustment point P0 as a base point. The radius is represented, for example, by a relative value of 0 to 100% of the Euclidean distance in the first color space CS1. FIG. 11C schematically illustrates an example of an adjustment range A0 in a case where the radius is specified.

Here, the radius in the first adjustment point P1 illustrated in FIGS. 7 and 11B corresponds to a first adjustment range A1 having the first adjustment point P1 as a base point and is an example of the first adjustment data representing the extent of the adjustment in the first adjustment point P1. A radius in the second adjustment point P2 illustrated in FIGS. 7 and 11B corresponds to a second adjustment range A2 having the second adjustment point P2 as a base point and is an example of the second adjustment data representing the extent of the adjustment in the second adjustment point P2.

Consequently, the first adjustment range A1 and the second adjustment range A2 from among the profiles to be adjusted 550 are configured in the first color space CS1.

Further, a process of S216 will be described with reference to FIG. 7 and the like.

The host apparatus 100 receives, in the field for designating an intent 860, a designation of a rendering intent for specifying the correspondence relationship of the profile to be adjusted 550. The plurality of designation items of the field for designating an intent 860 illustrated in FIG. 7 is not illustrated, but includes three types including "Perceptual", "Relative Colorimetric", and "Saturation". Needless to say, the designation items may include "Absolute Colorimetric" or lack some of "Perceptual", "Relative Colorimetric", and "Saturation". FIG. 7 illustrates an example in which "Perceptual" is designated for the designation intent.

Consequently, any one rendering intent from among a plurality of rendering intents for specifying the correspondence relationship of the profile to be adjusted 550 is received as the designation intent.

Further, a process of S217 will be described with reference to FIGS. 7, 12, and the like. Note that FIG. 12 is a diagram schematically illustrating an example of a linking configuration with the identifier.

The host apparatus 100 includes an identifier assignment unit U2, an identifier display processing unit UC, and an adjustment point display processing unit configured to display, on the display device 115, a list of all adjustment points P0 configured in the adjustment coordinate reception unit U1, and thus, the linking configuration reception unit U4 can perform linking configuration by designating the identifier assigned by the identifier display processing unit UC.

Figure 12:
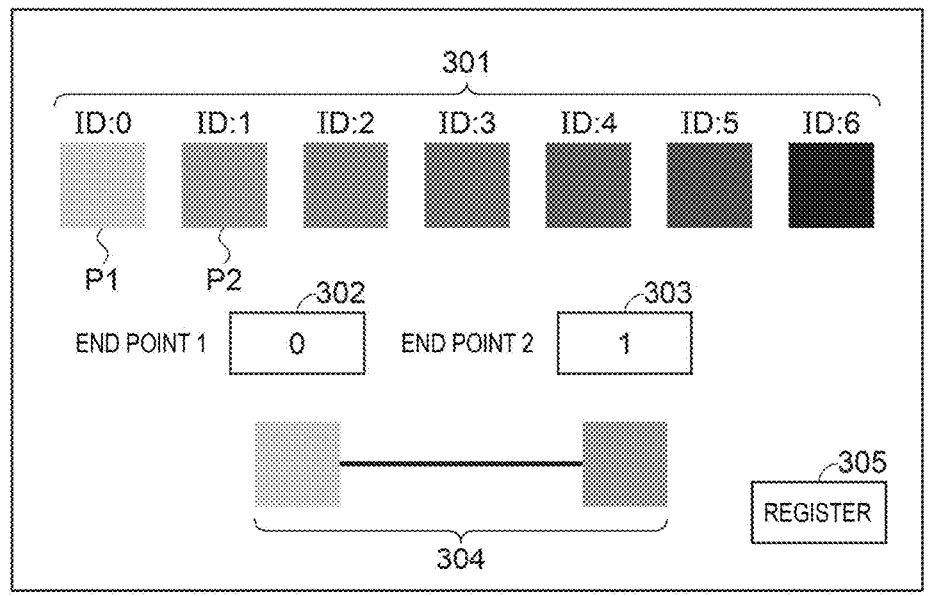
FIG. 12 schematically shows an example of a linking configuration by an identifier.

Therefore, when the button for configuring a gradation 844 in the UI screen 800 illustrated in FIGS. 7 and 11B receives an operation, a UI screen 801 illustrated in FIG. 12 is displayed on the display device 115. The UI screen 801 includes an all adjustment points display region 301 to be displayed in S23C described later, a field for configuring a gradation start position 302, a field for configuring a gradation end position 303, a gradation configuration condition display region 304 to be displayed in S23A described later, and a registration button 305.

The host apparatus 100 is configured to display an image displayed and generated in S23C described later in the all adjustment points display region 301. Furthermore, the field for configuring a gradation start position 302 receives, by the input device 116, a configuration of the first adjustment point P1 as the start position adjustment point. The field for configuring a gradation end position 303 receives, by the input device 116, a configuration of the second adjustment point P2 as the end position adjustment point. A configuration value for the field for configuring a gradation start position 302 (end point 1) and the field for configuring a gradation end position 303 (end point 2) can be controlled so that only input of identifier information displayed in association with the adjustment point P0 in the all adjustment points display region 301 is possible. The gradation configuration condition display region 304 is controlled in S23A described later so that a display condition changes in accordance with a configuration reception condition for the field for configuring a gradation start position 302 and the field for configuring a gradation end position 303.

FIGS. 7 and 12 illustrate an example in which a numerical value of a serial number in an addition order of the adjustment points P0 is applied as the identifier information. Furthermore, the drawings illustrate an example in which (C, M, Y, K)=(0, 0, 0, 0) assigned with an identifier "0" is selected for the first adjustment point P1 and an example in which (C, M, Y, K)=(5.10, 100.00, 100.00, 1.18) assigned with an identifier "1" is selected for the second adjustment point P2. An example is illustrated where a color standard configured by a coordinate value on the input color space CS4 of the adjustment point P0 assigned with an identifier configured for the field for configuring a gradation start position 302 and the field for configuring a gradation end position 303 is displayed in the gradation configuration condition display region 304.

By activating the registration button 305, after configuring both the first adjustment point P1 configured for the field for configuring a gradation start position 302 and the second adjustment point P2 configured in the field for configuring a gradation end position 303, linking configuration is performed with the two configured adjustment points being the end points of the gradation adjustment. After the linking configuration, an intermediate adjustment point is configured for gradation adjustment in S220, S222, and S224 described later.

Further, a process of S218 will be described with reference to FIG. 7 and the like.

The host apparatus 100 assigns, in S214, at a timing when a new adjustment point P0 is configured, a specific identifier to the new adjustment point P0. Thereafter, the assigned identifier functions as information for specifying a specific adjustment point P0 from all configured adjustment points $P_n$.

FIGS. 7 and 12 illustrate an example in which the numerical value of a serial number starting from 0 in a configuration order in S214 is applied to the identifier. It is sufficient that information specific to the adjustment point $P_n$ is used for the identifier, and thus, the assignment is possible without being limited to the numerical value. For example, a character string configured of the coordinate information of the input color space CS4 may be the identifier, and a character string representing a color name specified by the coordinate value on the input color space CS4 may be applied. An alphabetic character may be applied instead of a numerical value. However, when a length of the character string of the identifier to be assigned is long, it is more preferable that the field for configuring a gradation start position 302 and the field for configuring a gradation end position 303 illustrated in FIG. 12 are selected from a list displaying the identifiers of all registered adjustment points $P_n$, than being configured by typing a character.

Figure 13A:
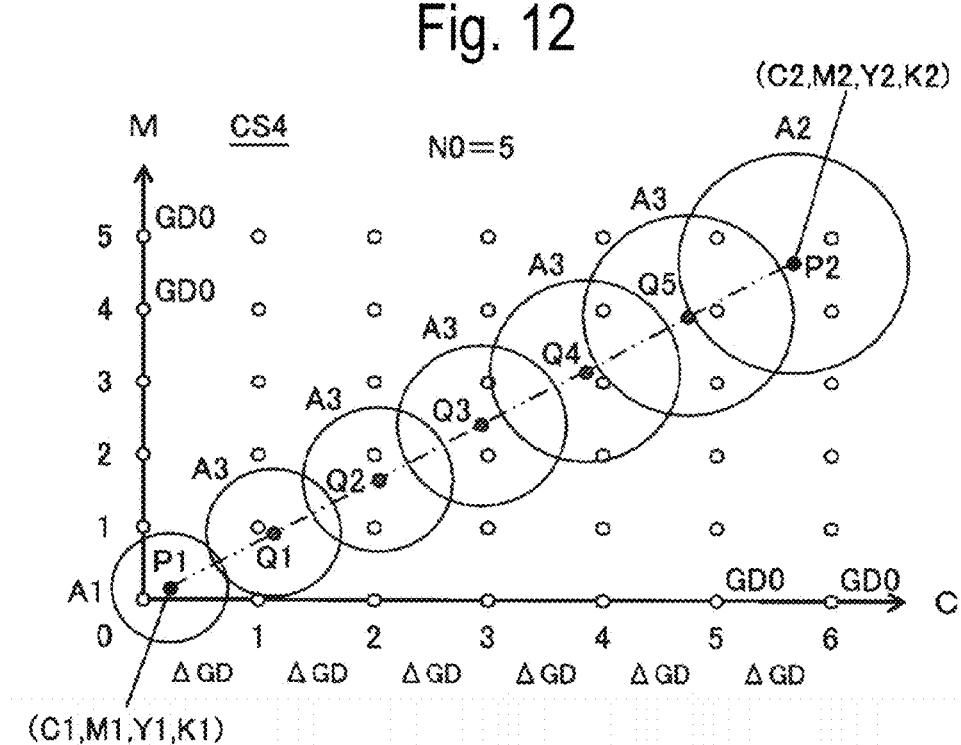
FIG. 13A schematically shows an example in which adjustment ranges are determined with adding third adjustment points between a first adjustment point and a second adjustment point and using the third adjustment points as base points.

Further, a process of S220 will be described with reference to FIG. 13A and the like. Note that FIG. 13A is a diagram schematically illustrating an example in which an adjustment range is determined. The adjustment range is obtained by adding third adjustment points between a first adjustment point and a second adjustment point to use the third adjustment points as base points.

When receiving an operation on the registration button 305 illustrated in FIG. 12, the host apparatus 100 terminates display of the UI screen 801 and configures third adjustment points Qx between the first adjustment point P1 and the second adjustment point P2 linked as the gradation end points. Here, the variable x is a variable for identifying a number of the plurality of configured third adjustment points Q. In the process of S220, the third adjustment points Qx of a third coordinate are configured between a first coordinate of the first adjustment point P1 and a second coordinate of the second adjustment point P2. Here, the coordinates representing the position of the first adjustment point P1, the second adjustment point P2, and the third adjustment points Qx are represented by coordinate values of the input color space CS4 of the profile to be adjusted 550. For example, when the input profile 610 is the profile to be adjusted 550, the coordinates of the first adjustment point P1, the second adjustment point P2, and the third adjustment points Qx are represented by the CMYK value. When the output profile 620 is the profile to be adjusted 550, the coordinates of the first adjustment point P1, the second adjustment point P2, and the third adjustment points Qx are represented by the Lab value. When the device link profile 630 is the profile to be adjusted 550, the coordinates of the first adjustment point P1, the second adjustment point P2, and the third adjustment points Qx are represented by the CMYK value.

FIG. 13A schematically illustrates a state where the third adjustment points Qx are configured between the first adjustment point P1 and the second adjustment point P2, and a third adjustment range A3 is determined with the third adjustment points Qx as base points by a process of S224 described later, when the input color space CS4 is the CMYK color space. The coordinate axes in the CMYK color space include the C-axis, M-axis, Y-axis, and K-axis, however, for simplicity, FIG. 13A illustrates the input color space CS4 of the profile to be adjusted 550 in a plane through the C-axis and the M-axis. Here, white circles indicate lattice points GD0 of the profile to be adjusted 550, black circles indicate the first adjustment point P1 and the second adjustment point P2, and hatched circles indicate the third adjustment points Qx. The C-axis and Y-axis in FIG. 13A indicate a coordinate value having an interval ΔGD of the lattice points GD0 as one unit.

The added third adjustment points Qx will be generated on a line linking the first adjustment point P1 and the second adjustment point P2 in the input color space CS4 of the profile to be adjusted 550. The number of configured third adjustment points Qx corresponds to a number N0 based on the interval ΔGD of the lattice points GD0 of the input color space CS4. Here, the number N0 is configured to be minimized as long as the third adjustment points Qx are included in at least one location between the lattice points of the profile to be adjusted 550. When the input color space CS4 is an Lab color space, the third adjustment points Qx can also be added similarly.

A process of S222 will be described with reference to FIG. 13B and the like. Note that FIG. 13B is a diagram schematically illustrating an example in which an adjustment target in the third adjustment points is determined.

After adding the third adjustment points Qx in S220, the host apparatus 100 determines third targets T3 of the third adjustment points Qx, based on the first target T1 of the first adjustment point P1 and the second target T2 of the second adjustment point P2. The process of S222 is a process of interpolating the third targets T3 for third coordinates of the third adjustment points Qx, based on the first target T1 for first coordinates of the first adjustment point P1 and the second target T2 for second coordinates of the second adjustment point P2.

Figure 13B:
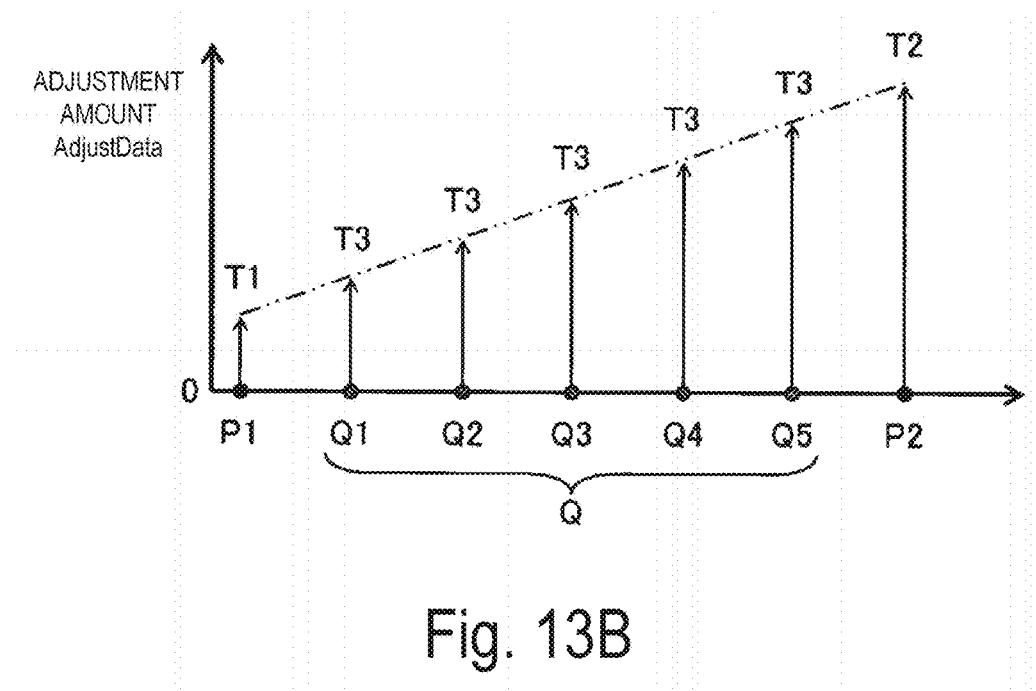
FIG. 13B schematically shows an example in which an adjustment target in the third adjustment points is determined.

FIG. 13B schematically illustrates a determination of the third targets T3 of the adjustment in the third adjustment points Qx by interpolation. In FIG. 13B, a horizontal axis indicates a position of the adjustment points P1, Qx, and P2, and a vertical axis indicates an adjustment amount Adjust Data. The adjustment amount Adjust Data is represented by a relative value and is represented by the CMYK value (hereinafter, ΔCp, ΔMp, ΔYp, ΔKp), the Lab value (hereinafter, ΔLp, Δap, Δbp) or the cmyk value (hereinafter, Δcp, Δmp, Δyp, Δkp).

For example, the adjustment amount Adjust Data is the CMYK value, the adjustment amount Adjust Data of the first adjustment point P1 (an example of the first target T1) is (ΔC1, ΔM1, ΔY1, ΔK1), and the adjustment amount Adjust Data of the second adjustment point P2 (an example of the second target T2) is (ΔC2, ΔM2, ΔY2, ΔK2). When the adjustment amount Adjust Data of the third adjustment points Qx (an example of the third targets T3) is represented by (ΔC3x, ΔM3x, ΔY3x, ΔK3x), the adjustment amount Adjust Data of the third adjustment points Qx can be calculated by the interpolation equations below.

$$\Delta C3x = \Delta C1 + x^*(\Delta C2 - \Delta C1)/(N0+1)$$

$$\Delta M3x = \Delta M1 + x^*(\Delta M2 - \Delta M1)/(N0+1)$$

$$\Delta Y3x = \Delta Y1 + x^*(\Delta Y2 - \Delta Y1)/(N0+1)$$

$$\Delta K3x = \Delta K1 + x^*(\Delta K2 - \Delta K1)/(N0+1)$$

When the adjustment amount Adjust Data is the Lab value or the cmyk value, the adjustment amount Adjust Data of the third adjustment points Qx can be calculated similarly. Note that the adjustment amount Adjust Data of the third adjustment points Qx is not limited to an interpolation value of the adjustment amount Adjust Data of the adjustment points P1 and P2, and can be a value shifted from an interpolation value.

Further, the process of S224 will be described with reference to FIG. 13A and the like.

After addition of the third adjustment points Qx in S220, the host apparatus 100 determines the third adjustment ranges A3 having the third adjustment points Qx as base points, based on the first adjustment range A1 having the first adjustment point P1 as a base point and the second adjustment range A2 having the second adjustment point P2 as a base point. The process of S224 may be performed before the process of S222. In S224, the third target ranges A3 for the third coordinates of the third adjustment points Qx are interpolated based on the first adjustment range A1 for the first coordinates of the first adjustment point P1 and the second adjustment range A2 for the second coordinates of the second adjustment point P2.

FIG. 13A schematically also illustrates a determination of the third adjustment ranges A3 having the third adjustment points Qx as base points by interpolation. For example, the first adjustment range A1 having the first adjustment point P1 as a base point may be a Radius_1 and the second adjustment range A2 having the second adjustment point P2 as a base point may be a Radius_2. When the third adjustment ranges A3 having the third adjustment points Qx as base points are represented by Radius_3x, the third adjustment ranges A3 can be derived from the following interpolation equation:

$$\text{Radius\_}3x = \text{Radius\_}1 + x*(\text{Radius\_}2 - \text{Radius\_}1)/(N0+1)$$

Note that the third adjustment ranges A3 having the third adjustment points Qx as base points are not limited to interpolation values of the adjustment ranges A1 and A2 having the adjustment points P1 and P2 as base points, and can be values shifted from the interpolation values.

Further, a process of S23A will be described with reference to FIG. 12 and the like.

The host apparatus 100 executes S23A after the linking configuration in S217. In S23A, a relationship of the two linked adjustment points P1 and P2 is displayed to facilitate a visual comprehension. FIG. 12 illustrates an example in which the linked first adjustment point P1 and second adjustment point P2 are each represented by a color standard configured of a coordinate value of the input color space CS4, by the gradation configuration condition display region 304, and the two adjustment points are connected with a line to display the linked relationship. Here, the linking relationship may not only be represented through a connection with a line, but also represented through a display where a part of the color standard overlaps, and represented through a display where based on contrast with the adjustment point P0 to which the linking configuration is not set, a display interval between the adjustment points to which the linking configuration is applied is narrowed and a display interval between the adjustment points to which no linking configuration is applied is widened. In the target reception region 840 in FIG. 7, the linking relationship may be represented by displaying a numerical value being an identifier in a column of "Pair".

Further, a process of S23B will be described with reference to FIG. 14 and the like. Note that FIG. 14 is a diagram schematically illustrating an influence range display on any image.

The host apparatus 100 includes an image display processing unit configured to display any image in the display device 115, and thus, the whole adjustment influence range display processing unit UB can display a region included in the whole adjustment influence range in an overlapping manner on any image displayed in the display device 115 by the image display processing unit.

Figure 14:
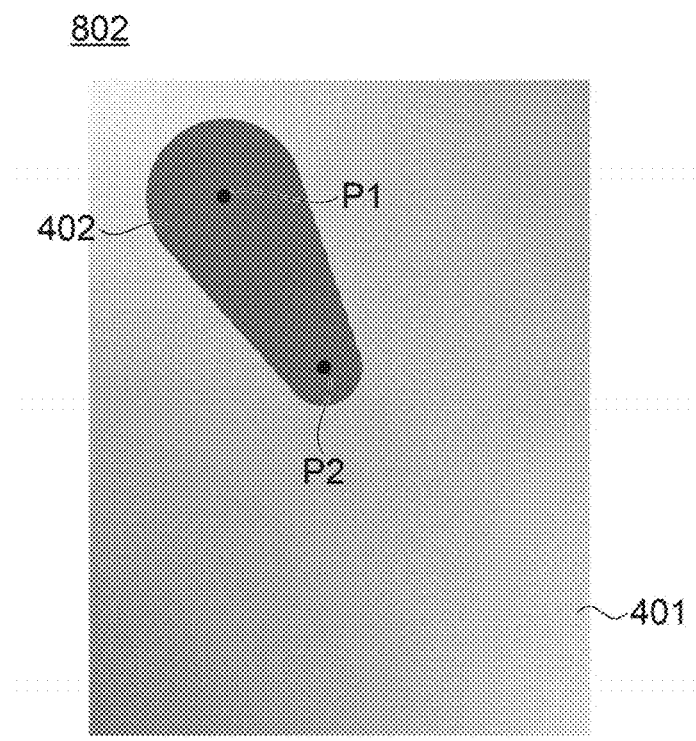
FIG. 14 schematically shows an influence range display on any image.

Therefore, when an operation on the button for confirming an adjustment location 846 is received in the UI screen 800 illustrated in FIG. 7, the UI screen 802 illustrated in FIG. 14 is displayed in the display device 115.

In the UI screen 802 illustrated in FIG. 14, an image display region 401 and an adjustment influence region 402 of the input color space CS4 are included.

FIG. 14 illustrates an example in which when the profile adjustment is executed based on the adjustment point received until now and the configured adjustment point on an image of the color space corresponding to the input color space CS4, a region with a varying color as a result of being affected by the adjustment is displayed in a one-color spot color. Here, FIG. 14 illustrates a diagram in which a part of the CMYK space is schematically represented when the input color space CS4 may use CMYK, and thus, the adjustment influence region 402 represented by a spot color forms a cluster; however, when photograph-like data is applied, the adjustment influence region 402 will be represented dispersedly over a wide area of the image. However, when with the configuration of FIG. 14, a user applies a profile having been actually adjusted to set the image data to be desirably printed in a confirmation image setting location not illustrated, a location changing as a result of being affected by the adjustment can be grasped on an actual image before the print. The influence range location may not only be displayed by a spot color, but also be displayed by gradation from any color to white where not only the adjustment influence range but also the level of the adjustment may be represented. Furthermore, while the adjustment range A0 is displayed on the image, control may be performed so that the adjustment influence range A0 received by manipulating the data of a column "Radius" on the target reception region 840 illustrated in FIG. 11B and the third adjustment ranges A3 configured in S224 to the third adjustment point Qx are fluctuated in real time. When the control is performed so that the adjustment influence range is fluctuated in real time, as described above, the user can visually adjust the influence range.

Further, a process of S23C will be described with reference to FIG. 12 and the like.

In S23C, a display control is performed so that it is possible to understand that the identifier assigned in S218 is associated with the adjustment point P0 received in S214. For example, in FIG. 12, the adjustment point P0 received in S214 is represented by a color standard based on a coordinate value of the input color space CS4. In S23C, a state is illustrated where the identifier is displayed above the color standard so that it is possible to recognize that the color standard and the identifier are associated. In addition, the identifier may be superposed on the color standard to be displayed, and a tooltip-like display is also possible at a timing at which a pointing device that is the input device 116 is superposed on the color standard.

Next, a process subsequent to S104 will be described.

When receiving the operation on the button for "executing an adjustment" in FIG. 7, the host apparatus 100 ends the display of the UI screen 800 and ends the processes of S210 and S102, and performs a process subsequent to S104 in FIG. 5. Here, when the "Perceptual" is designated in the field for designating an intent 860, the host apparatus 100 uses information in accordance with the A2B0 tag and the B2A0 tag illustrated in FIG. 4 out of the profile 500 in the process subsequent to S104. Here, when the "Relative Colorimetric" is designated in the field for designating an intent 860, the host apparatus 100 uses information in accordance with the A2B1 tag and the B2A1 tag illustrated in FIG. 4 out of the profile 500 in the process subsequent to S104. Here, when the "Saturation" is designated in the field for designating an intent 860, the host apparatus 100 uses information that corresponds to the A2B2 tag and the B2A2 tag illustrated in FIG. 4 out of the profile 500 in the process subsequent to S104.

Firstly, as for each adjustment point P0 input to the target reception region 840 and the added third adjustment point Qx, the host apparatus 100 evaluates a current output value Current Out in accordance with a profile (including a combination of profiles) for color conversion designated in the profile selection fields 811 to 813 (S104). This is because the adjustment is performed based on an output color $cmyk_p$ corresponding to the color of the output image to be formed on a print substrate. When the information in accordance with the designation intent is in the profile, the color conversion is performed according to the information in accordance with the designation intent.

In the following description, mere mentioning of the adjustment point P0 means that the third adjustment point Qx is included in the adjustment point P0.

Here, the above-described color conversion in accordance with the designation intent of the profile is represented by $f_{icc}$ (a first argument, a second argument, a third argument). However, the first argument represents a profile to be used. In the first argument, Input Profile denotes the input profile 610, Output Profile denotes the output profile 620, and DL Profile denotes the device link profile 630. In the second argument, A2B denotes a conversion from the device color to the device independent color, B2A denotes a conversion from the device independent color to the device color, and A2B0 denotes a conversion based on the device link table. The third argument Input denotes an input value (CMYK, RGB, Lab and the like) of the adjustment point P0.

For example, on the assumption that the variable p is a variable for identifying the adjustment point P0, when only the input profile 610 is designated for color conversion (a-1), the input value Input of each adjustment point P0 is a CMYK value (Cp, Mp, Yp, Kp). In this case, the current output value Current Out is an Lab value (Lp, ap, bp). In the case of the above (a-1), the profile to be adjusted 550 automatically becomes the input profile 610, and the current output value Current Out can be calculated according to the following equation:

Current Out=$f_{icc}$(Input Profile, A2B, Input)

When only the input profile 620 is designated for color conversion (a-2), the input value Input of each adjustment point P0 is an Lab value (Lp, ap, bp). In this case, the current output value Current Out is a cmyk value (cp, mp, yp, kp).

In the case of the above (a-2), the profile to be adjusted 550 automatically becomes the output profile 620, and the current output value Current Out can be calculated according to the following equation:

Current Out=$f_{icc}$(Output Profile, B2A, Input)

When the device link profile 630 is designated for color conversion (a-3), the input value Input of each adjustment point P0 is a CMYK value (Cp, Mp, Yp, Kp). In this case, the current output value Current Out is a cmyk value (cp, mp, yp, kp).

In the case of the above (a-3), the profile to be adjusted 550 automatically becomes the device link profile 630, and the current output value Current Out can be calculated according to the following equation:

Current Out=$f_{icc}$(DL Profile, A2B0, Input)

When a combination of the profiles 610, 620 is designated for color conversion (b-1), (b-2), the input value Input of each adjustment point P0 is a CMYK value (Cp, Mp, Yp, Kp). In this case, the current output value Current Out is a cmyk value (cp, mp, yp, kp).

In the case of the above (b-1), (b-2), whether the profile to be adjusted 550 is the input profile 610 or the output profile 620, the current output value Current Out can be calculated according to the following equation:

Current Out=$f_{icc}$(Output Profile, B2A, $f_{icc}$(Input Profile, A2B, Input))

After the current output value Current Out is calculated, as for the adjustment point P0, the host apparatus 100 evaluates a target output value Target Out in accordance with the profile (including a combination of the profiles) for color conversion designated in the profile selection fields 811 to 813 and the color space to be adjusted CS6 designated in the field for selecting a color space to be adjusted 830 (S106). This is because the adjustment is performed based on an output color $cmyk_p$ corresponding to the color of the output image to be formed on a print substrate. When the information in accordance with the designation intent is in the profile, the color conversion is performed according to the information in accordance with the designation intent.

For example, when only the input profile 610 is designated for color conversion and the input color space CS4 is designated for the color space to be adjusted CS6 (a-1-1), an adjustment amount Adjust Data is added to the CMYK value (Cp, Mp, Yp, Kp) in the CMYK color space. The adjustment amount Adjust Data is represented by a relative value (ΔCp, ΔMp, ΔYp, ΔKp). In the CMYK color space, the adjusted CMYK value is represented by (Cp+ΔCp, Mp+ΔMp, Yp+ΔYp, Kp+ΔKp).

In the case of the above (a-1-1), the target output value Target Output can be calculated according to the following equation:

Target Out=$f_{icc}$(Input Profile, A2B, Input+Adjust Data)

When only the input profile 610 is designated for color conversion and the output color space CS5 is designated for the color space to be adjusted CS6 (a-1-2), an adjustment amount Adjust Data is added to the Lab value (Lp, ap, bp) in the Lab color space. The adjustment amount Adjust Data is represented by a relative value (ΔLp, Δap, Δbp). In the Lab color space, the adjusted Lab value is represented by (Lp+ΔLp, ap+Δap, bp+Δbp).

In the case of the above (a-1-2), the target output value Target Output can be calculated according to the following equation:

Target Out=$f_{icc}$(Input Profile, A2B, Input)+Adjust Data

When only the output profile 620 is designated for color conversion and the input color space CS4 is designated for the color space to be adjusted CS6 (a-2-1), an adjustment amount Adjust Data is added to the Lab value (Lp, ap, bp) in the Lab color space. The adjustment amount Adjust Data is represented by a relative value (ΔLp, Δap, Δbp). In the Lab color space, the adjusted Lab value is represented by (Lp+ΔLp, ap+Δap, bp+Δbp).

In the case of the above (a-2-1), the target output value Target Output can be calculated according to the following equation:

Target Out=$f_{icc}$(Output Profile, B2A, Input+Adjust Data)

When only the output profile 620 is designated for color conversion and the output color space CS5 is designated for the color space to be adjusted CS6 (a-2-2), an adjustment amount Adjust Data is added to the cmyk value (cp, mp, yp, kp) in the cmyk color space. The adjustment amount Adjust Data is represented by a relative value ($\Delta$cp, $\Delta$mp, $\Delta$yp, $\Delta$kp). In the cmyk color space, the adjusted cmyk value is represented by (cp+$\Delta$cp, mp+$\Delta$mp, yp+$\Delta$yp, kp+$\Delta$kp).

In the case of the above (a-2-2), the target output value Target Output can be calculated according to the following equation:

Target Out=$f_{icc}$(Output Profile, *B2A*, Input)+Adjust Data

When the device link profile 630 is designated for color conversion and the input color space CS4 is designated for the color space to be adjusted CS6 (a-3-1), an adjustment amount Adjust Data is added to the CMYK value (Cp, Mp, Yp, Kp) in the CMYK color space. The adjustment amount Adjust Data is represented by a relative value ($\Delta$Cp, $\Delta$Mp, $\Delta$Yp, $\Delta$Kp). In the CMYK color space, the adjusted CMYK value is represented by (Cp+$\Delta$Cp, Mp+$\Delta$Mp, Yp+$\Delta$Yp, Kp+$\Delta$Kp).

In the case of the above (a-3-1), the target output value Target Output can be calculated according to the following equation:

Target Out=$f_{icc}$(DL Profile, *A2B0*, Input+Adjust Data)

When the device link profile 630 is designated for color conversion and the output color space CS5 is designated for the color space to be adjusted CS6 (a-3-2), an adjustment amount Adjust Data is added to the cmyk value (cp, mp, yp, kp) in the cmyk color space. The adjustment amount Adjust Data is represented by a relative value ($\Delta$cp, $\Delta$mp, $\Delta$yp, $\Delta$kp). In the cmyk color space, the adjusted cmyk value is represented by (cp+$\Delta$cp, mp+$\Delta$mp, yp+$\Delta$yp, kp+$\Delta$kp).

In the case of the above (a-3-2), the target output value Target Output can be calculated according to the following equation:

Target Out=$f_{icc}$(DL Profile, *A2B0*, Input)+Adjust Data

Note that it may be assumed that the Lab color space is designated for the color space to be adjusted CS6. In this case, the Lab color space is the output color space CS5 in the input profile 610 and is the input color space CS4 in the output profile 620. The target output value Target Out may be calculated by referring, for example, to the output profile 620 used for creating the device link profile 630.

When a combination of the profiles 610, 620 is designated for color conversion and the input color space CS4 of the input profile 610 is designated for the color space to be adjusted CS6 (b-1-1), an adjustment amount Adjust Data is added to the CMYK value (Cp, Mp, Yp, Kp) in the CMYK color space. The adjustment amount Adjust Data is represented by a relative value ($\Delta$Cp, $\Delta$Mp, $\Delta$Yp, $\Delta$Kp). In the CMYK color space, the adjusted CMYK value is represented by (Cp+$\Delta$Cp, Mp+$\Delta$Mp, Yp+$\Delta$Yp, Kp+$\Delta$Kp).

In the case of the above (b-1-1), the target output value Target Output can be calculated according to the following equation:

Target Out=$f_{icc}$(Output Profile, *B2A*, $f_{icc}$(Input Profile, *A2B*, Input+Adjust Data))

The above-described equation is used even when the profile to be adjusted 550 is the output profile 620.

When a combination of the profiles 610, 620 is designated for color conversion and the output color space CS5 of the output profile 620 is designated for the color space to be adjusted CS6 (b-1-2), an adjustment amount Adjust Data is added to the cmyk value (cp, mp, yp, kp) in the cmyk color space. The adjustment amount Adjust Data is represented by a relative value ($\Delta$cp, $\Delta$mp, $\Delta$yp, $\Delta$kp). In the cmyk color space, the adjusted cmyk value is represented by (cp+$\Delta$cp, mp+$\Delta$mp, yp+$\Delta$yp, kp+$\Delta$kp).

In the case of the above (b-1-2), the target output value Target Output can be calculated according to the following equation:

Target Out=$f_{icc}$(Output Profile, *B2A*, $f_{icc}$(Input Profile, *A2B*, Input))+Adjust Data The above-described equation is used even when the profile to be adjusted 550 is the output profile 620.

When a combination of the profiles 610, 620 is designated for color conversion and the PCS (the output color space CS5 in the input profile 610 and the input color space CS4 in the output profile 620) is designated for the color space to be adjusted CS6 (b-1-3), an adjustment amount Adjust Data is added to the Lab value (Lp, ap, bp) in the Lab color space. The adjustment amount Adjust Data is represented by a relative value ($\Delta$Lp, $\Delta$ap, $\Delta$bp). In the Lab color space, the adjusted Lab value is represented by (Lp+$\Delta$Lp, ap+$\Delta$ap, bp+$\Delta$bp).

In the case of the above (b-1-3), the target output value Target Output can be calculated according to the following equation:

Target Out=$f_{icc}$(Output Profile, *B2A*, $f_{icc}$(Input Profile, *A2B*, Input)+Adjust Data)

The above-described equation is used even when the profile to be adjusted 550 is the output profile 620.

Note that the calculation of the target output value Target Out can be omitted when the adjustment target T0 is represented by the output coordinate value, and may only be performed when the adjustment target T0 is not represented by the output coordinate value.

After the calculation of the target output value Target Out, the host apparatus 100 obtains, for the adjustment point P0, an input value Input_P and an adjustment target value Target Out_P for the profile to be adjusted 550 (S108). This is for adjusting the correspondence relationship between the input value and the output value in the profile to be adjusted 550. When the information in accordance with the designation intent is in the profile, the color conversion is performed according to the information in accordance with the designation intent.

In the case of the (a-1), (a-2), and (a-3), that is, when one profile (any one of the profiles 610, 620, and 630) is designated for the color conversion, the designated profile is the profile to be adjusted 550. Thus, the input value Input of the designated profile is used as the input value Input_P in the profile to be adjusted 550, and the target output value Target Out of the designated profile is used as the adjustment target value Target Out_P in the profile to be adjusted 550. The equations are as follows:

Input_P=Input

Target Out_P=Target Out

Furthermore, the current output value Current Out_P in the profile to be adjusted 550 is the current output value Current Out of the designated profile.

Current Out_P=Current Out

When a relative value of the adjustment target T0 is represented by the output color space CS5 of the profile to be adjusted 550, the value is Target Out_P−Current Out_P.

In the case of the (b-1), that is, when a combination of the profiles 610, 620 is selected for color conversion and the input profile 610 is designated for the profile to be adjusted 550, the input value Input of the combination of the profiles 610, 620 is used as the input value Input_P in the profile to be adjusted 550. The adjustment target value Target Out_P (Lab value) of the profile to be adjusted 550 can be calculated from the target output value Target Out that is the cmyk value.

Input_P=Input

Target Out_P=$f_{icc}$(Output Profile, A2B, Target Out)

The adjustment target value Target Out_P (Lab value) of the profile to be adjusted 550 is derived from the target output value Target Out (cmyk value) so that the adjustment is performed based on the output color $cmyk_p$ corresponding to a color of the output image.

Furthermore, the current output value Current Out_P (Lab value) of the profile to be adjusted 550 is represented by the following equation:

Current Out_P=$f_{icc}$(Input Profile, A2B, Input)

When a relative value of the adjustment target T0 is represented by the output color space CS5 of the profile to be adjusted 550, the value is Target Out_P−Current Out_P.

In the case of the (b-2), that is, when a combination of the profiles 610, 620 is selected for color conversion and the output profile 620 is designated for the profile to be adjusted 550, the target output value Target Out of the combination of the profiles 610, 620 is used as the adjustment target value Target Out_P in the profile to be adjusted 550. The input value Input_P (Lab value) of the profile to be adjusted 550 can be calculated from the input value Input (CMYK value) that is a CMYK value.

Input_P=$f_{icc}$(Input Profile, A2B, Input)

Target Out_P=Target Out

Furthermore, the current output value Current Out_P (cmyk value) in the profile to be adjusted 550 is the current output value Current Out of the combination of the profiles 610, 620.

Current Out_P=Current Out

When a relative value of the adjustment target T0 is represented by the output color space CS5 of the profile to be adjusted 550, the value is Target Out_P−Current Out_P.

After acquiring the input value Input_P and the adjustment target value Target Out_P in the profile to be adjusted 550, the host apparatus 100 adjusts, in S110 to S112, the adjustment range A0 of the profile to be adjusted 550, based on the adjustment target T0.

Figure 15A:
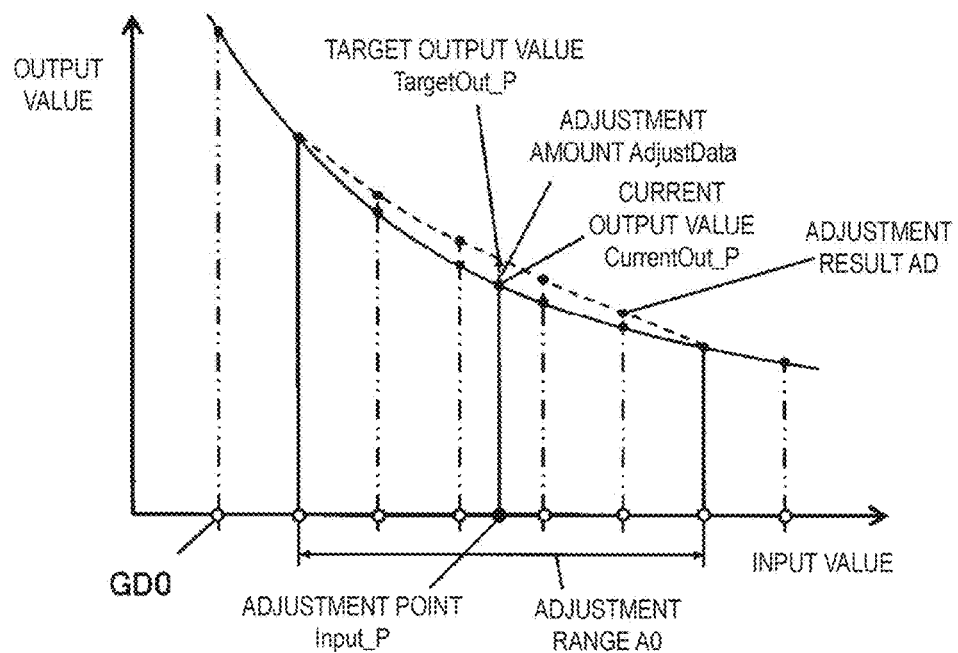
FIG. 15A schematically shows an adjustment amount of each lattice point when performing adjustment in an output color space of a profile to be adjusted.
Figure 15B:
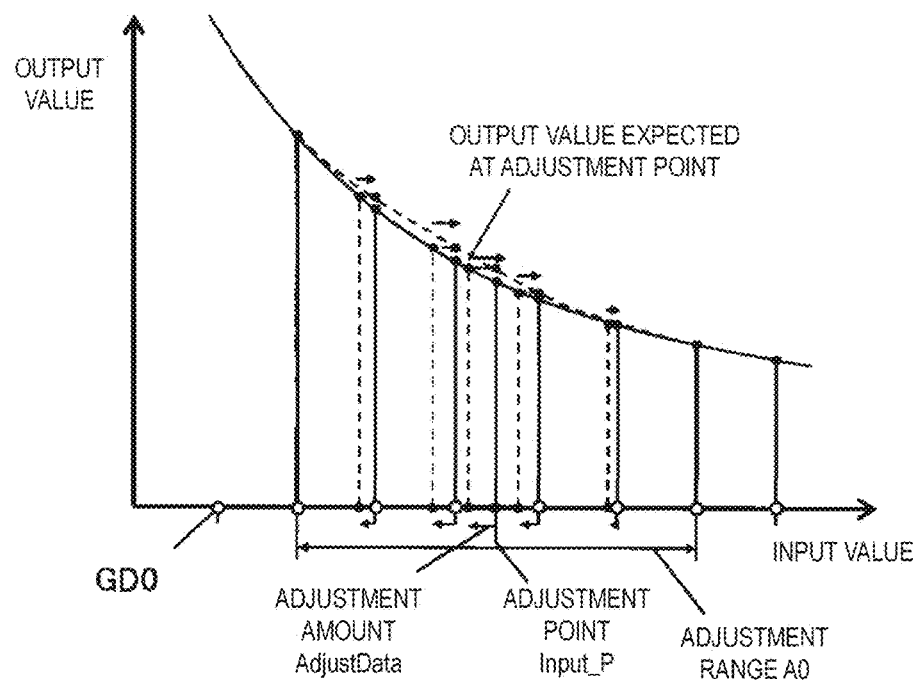
FIG. 15B schematically shows an adjustment amount of each lattice point when performing adjustment in an input color space of a profile to be adjusted.

First, a concept for adjusting the profile to be adjusted 550 in the adjustment range A0 will be described with reference to FIGS. 15a and 15B. Note that FIG. 15A is a diagram schematically illustrating an adjustment amount of each lattice point when the adjustment is performed in the output color space of the profile to be adjusted. FIG. 15B is a diagram schematically illustrating the adjustment amount of each lattice point when the adjustment is performed in the input color space of the profile to be adjusted. Here, in FIGS. 15A and 15B, a horizontal axis indicates an input value along a certain coordinate axis of the input color space CS4 and a vertical axis indicates an output value along a certain coordinate axis of the output color space CS5. For example, when the input color space CS4 is the CMYK color space, the horizontal axis is the C-axis, the M-axis, the Y-axis, or the K-axis. When the output color space CS5 is the Lab color space, the vertical axis is the L-axis, the a-axis, or the b-axis. A white circle on the horizontal axis indicates the lattice point GD0.

FIG. 15A schematically illustrates an example of an adjustment amount AD of each lattice point GD0 when the output value is adjusted. The adjustment point P0 corresponds to the input value Input_P. When the adjustment amount Adjust Data is given for the adjustment target T0, the adjustment target value Target Out_P is configured, the adjustment target value Target Out_P being obtained by adding the adjustment amount Adjust Data to the current output value Current Out_P corresponding to the input value Input_P. Needless to say, when the color space to be adjusted CS6 is the cmyk color space, the current output value Current Out_P and the adjustment target value Target Out_P are represented by the cmyk value and the adjustment amount Adjust Data is represented by a relative value (Δcp, Δmp, Δyp, Δkp) of the cmyk value. When the color space to be adjusted CS6 is the Lab color space, the current output value Current Out_P and the adjustment target value Target Out_P are represented by the Lab value and the adjustment amount Adjust Data is represented by a relative value (ΔLp, Δap, Δbp) of the Lab value.

The adjustment range A0 is configured for the adjustment amount Adjust Data by S215 in FIG. 6, the input to the target reception region 840 illustrated in FIG. 7, and the process of S224 in FIG. 6. Basically, the adjustment range A0 is set so that the adjustment amount of the output value for the input value Input_P is made maximum and the adjustment amount is zero at a boundary of the adjustment range A0. However, the actual adjustment is performed on the lattice point GD0 of the profile to be adjusted 550, and thus, an influence from the adjustment may extend to a range wider than the configured adjustment range A0.

FIG. 15B schematically illustrates an example of the adjustment amount AD of each lattice point GD0 when the input value is adjusted. The adjustment point P0 corresponds to the input value Input_P. When the adjustment amount Adjust Data is configured for the adjustment target T0, an output value corresponding to an input value Input_P+Adjust Data in which the adjustment amount Adjust Data is added to the input value Input_P is an expected output value in the adjustment point P0. Needless to say, when the color space to be adjusted CS6 is the CMYK color space, the input value Input_P is represented by the CMYK value and the adjustment amount Adjust Data is represented by a relative value (ΔCp, ΔMp, ΔYp, ΔKp) of the CMYK value. When the color space to be adjusted CS6 is the Lab color space, the input value Input_P is represented by the Lab value and the adjustment amount Adjust Data is represented by a relative value (ΔLp, Δap, Δbp) of the Lab value.

The correction described above is performed for all coordinate axes of the input color space CS4 and all coordinate values of the output color space CS5.

Figure 16A:
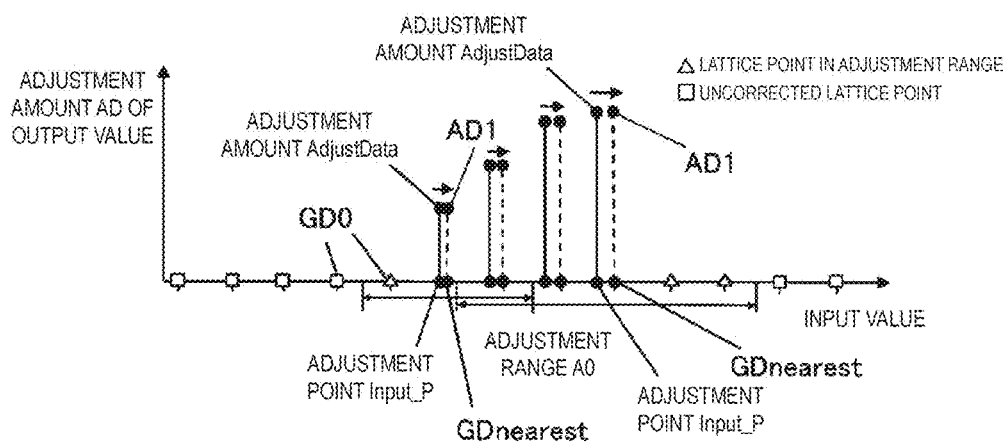
FIG. 16A schematically shows an example in which an adjustment amount of an output value for the nearest lattice point is determined.
Figure 16B:
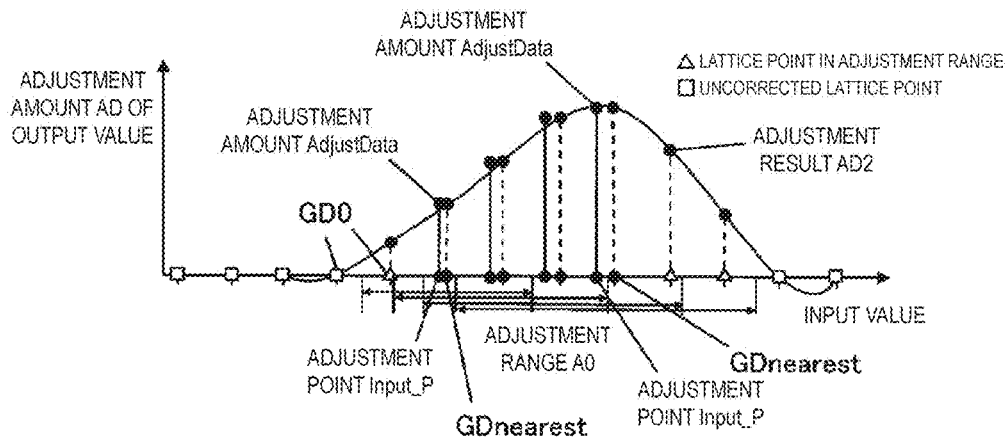
FIG. 16B schematically shows an example in which an adjustment amount of an output value for a lattice point around the nearest lattice point is determined.

Next, an example is described in which the adjustment amount AD is configured for each lattice point GD0 in the adjustment range A0, with reference to FIGS. 16A and 16B. Note that FIG. 16A is a diagram schematically illustrating an example of determining an adjustment amount of an output value for the nearest lattice point. FIG. 16B is a diagram schematically illustrating an example of determining an adjustment amount of an output value for a lattice point around the nearest lattice point. Here, in FIGS. 16A and 16B, a horizontal axis indicates the input value and a vertical axis indicates the adjustment amount AD of the output value. Furthermore, a triangle on the horizontal axis indicates a lattice point GD0 (excluding the nearest lattice point GDnearest) in the adjustment range A0 and a rectangle on the horizontal axis indicates a lattice point GD0 outside of the adjustment range A0, for which the output value is not corrected.

First, as illustrated in FIG. 16A, the host apparatus 100 determines, in each adjustment point P0, an adjustment amount AD1 of an output value for the nearest lattice point GDnearest that is the lattice point GD0 nearest to the adjustment point P0 (S110 in FIG. 5). FIG. 16A illustrates an example of determining the adjustment amount AD1 of the output value when four adjustment points P0 (input values Input_P) are present on a certain coordinate axis of the input color space CS4. In the example in FIG. 16A, the adjustment amount Adjust Data of the input value Input_P is set as the adjustment amount AD1 of the output value for the nearest lattice point GDnearest. Needless to say, the present technology is not limited to setting the adjustment amount AD1 of the output value for the nearest lattice point GDnearest as the adjustment amount Adjust Data.

After determining the adjustment amount AD1 of the output value for the nearest lattice point GDnearest, the host apparatus 100 determines, as illustrated in FIG. 16B, an adjustment amount AD2 of an output value for a lattice point (lattice point indicated as triangle) around the nearest lattice point GDnearest in the adjustment range A0 (S112 in FIG. 5). For example, the adjustment amount AD2 of the output value for the peripheral lattice point can be determined by setting the adjustment amount of the output value for a lattice point GD0 outside of the adjustment range A0 to zero, setting the adjustment amount AD1 of the output value for each nearest lattice point GDnearest described above to the Adjust Data, and performing an interpolation calculation by a three-dimensional or four-dimensional cubic spline function. Here, when the input color space CS4 is the CMYK color space, the interpolation calculation may be performed by the four-dimensional cubic spline function and when the input color space CS4 is the Lab color space, the interpolation calculation may be performed by the three-dimensional cubic spline function. By performing such an interpolation calculation, the adjustment amount AD2 of the output value for the peripheral lattice point GD0 is smoothly linked between the adjustment amount AD1 of the output value for each nearest lattice point GDnearest and the adjustment amount "0" of the output value for the lattice point outside the adjustment range A0.

Needless to say, the present technology is not limited to using the spline function in the interpolation calculation.

Some users may desire to adjust a color within a range of a gradation that is linked between two different adjustment points P1 and P2 and changes continuously, as in a gradation image. When the first adjustment point P1 and the second adjustment point P2 are separated from each other in the input color space CS4, the adjustment ranges A1, A2 configured for the adjustment points P1 and P2 do not overlap and even when the adjustment amount Adjust Data is configured for only the adjustment points P1 and P2, a color between the adjustment points P1 and P2 is not adjusted and thus, gradation of the output image may decrease. However, if the adjustment ranges A1, A2 of the adjustment points P1 and P2 are wide, even a color not to be adjusted may be adjusted. Many adjustment points and a large adjustment amount Adjust Data also need to be configured between the adjustment points P1 and P2 in order to prevent the undesired adjustment. Especially when the adjustment points P1 and P2 are separated from each other, the configuration of the adjustment points and the adjustment amount Adjust Data is more complicated.

In the present specific example, the third adjustment points Qx are automatically added between the adjustment points P1 and P2 having the linking configuration, the adjustment amount Adjust Data and the third adjustment ranges A3 of the third adjustment points Qx are also automatically determined, and adjustment data of the third adjustment points Qx is also reflected in the adjustment of the profile 500. Thus, the work load for improving the gradation of the output image is reduced.

After determining the adjustment amount AD of the output value for each lattice point GD0 in the adjustment range A0, the host apparatus 100 brings the determined adjustment amount AD to the profile to be adjusted 550 (S114 in FIG. 5). That is, in each lattice point GD0 in the adjustment range A0, a value obtained by adding the adjustment amount AD to the current output value may be written, as an updated output value, to the profile to be adjusted 550. For example, when the output color space CS5 of the profile to be adjusted 550 is the cmyk color space, a value (cq+$\Delta$cq, mq+$\Delta$mq, yq+$\Delta$yq, kq+$\Delta$kq) obtained by adding the adjustment amount ($\Delta$cq, $\Delta$mq, $\Delta$yq, $\Delta$kq) to the current output value (cq, mq, yq, kg) is the updated output value. When the output color space CS5 of the profile to be adjusted 550 is the Lab color space, a value (Lq+$\Delta$Lq, aq+$\Delta$aq, bq+$\Delta$bq) obtained by adding the adjustment amount ($\Delta$Lq, $\Delta$aq, $\Delta$bq) to the current output value (Lq, aq, bq) is the updated output value. Here, the variable q is a variable for identifying a lattice point GD0 in the adjustment range A0.

Thus, the correspondence relationship of the profile to be adjusted 550 is adjusted so that the current output value Current Out in the second color space CS2 is close to the target output value Target Out. When the information in accordance with the designation intent is in the profile to be adjusted 550, the profile to be adjusted 550 is adjusted in the correspondence relationship in accordance with the designation intent.

Consequently, the profile to be adjusted 550 is adjusted so that the current output value Current Out obtained in accordance with a combination of profiles including the profile to be adjusted 550 or the current profile to be adjusted 550 from the input coordinate value corresponding to the adjustment point P0, is close to the target output value Target Out. Thus, the profile to be adjusted 550 is adjusted by using a coordinate value representing the output color $cmyk_p$ as reference. In the present specific example, a profile used in the conversion of the coordinate value of the color space can be adjusted to have a good color reproduction accuracy. In this case, it is possible to configure the profile 550 to be adjusted and the color space to be adjusted CS6, and thus, the present specific example can be adapted smoothly to an utilization environment of a user.

Furthermore, the third adjustment point Q is automatically added between adjustment points P1 and P2 configured in pair, the third target T3 and the third adjustment range A3 of the adjustment of the third adjustment point Q are also automatically determined, and adjustment data of the third adjustment points Qx is also used for the adjustment of the profile 500. Thus, the present specific example can provide a technology for easily improving the gradation of an output image.

5. Modified Example

Various modified examples are conceivable within the scope of the present invention.

For example, an output device is not limited to the printer 200 such as an ink jet printer, but may be an electrophotographic printer such as a laser printer, a three-dimensional printer, or a display device.

Types of color material forming an image are not limited to C, M, Y, and K, but may include, in addition to C, M, Y, and K, Dy (dark yellow), Or (orange), and Gr (green) with higher concentration than Lc, Lm, and Y, Lk (light black) with lower concentration than K, a color material without coloration for improving image quality, and the like.

Needless to say, the second color space CS2 is not limited to the cmyk color space, but may be a CMY color space, an RGB color space, or the like.

A target device is not limited to the target printing machine 300, but may be a display device or the like.

Needless to say, the first color space CS1 is not limited to the CMYK color space, but may be a CMY color space, an RGB color space, or the like.

A color space selectable as the color space to be adjusted CS6 is not limited to three types being the first color space CS1, the second color space CS2, and the Profile Connection Space CS3, but may include two types being the first color space CS1 and the second color space CS2, may include two types being the first color space CS1 and the Profile Connection Space CS3, and may include two types being the second color space CS2 and the Profile Connection Space CS3.

In S217, a description is provided in which, upon receiving an operation on the button for configuring a gradation 844 of the UI screen 800 illustrated in FIGS. 7 and 11B, the host apparatus 100 displays the UI screen 801 illustrated in FIG. 12 on the display device 115 and performs linking configuration, however, a linking configuration method may also be as follows.

Linking Configuration Method 1

Figure 17:
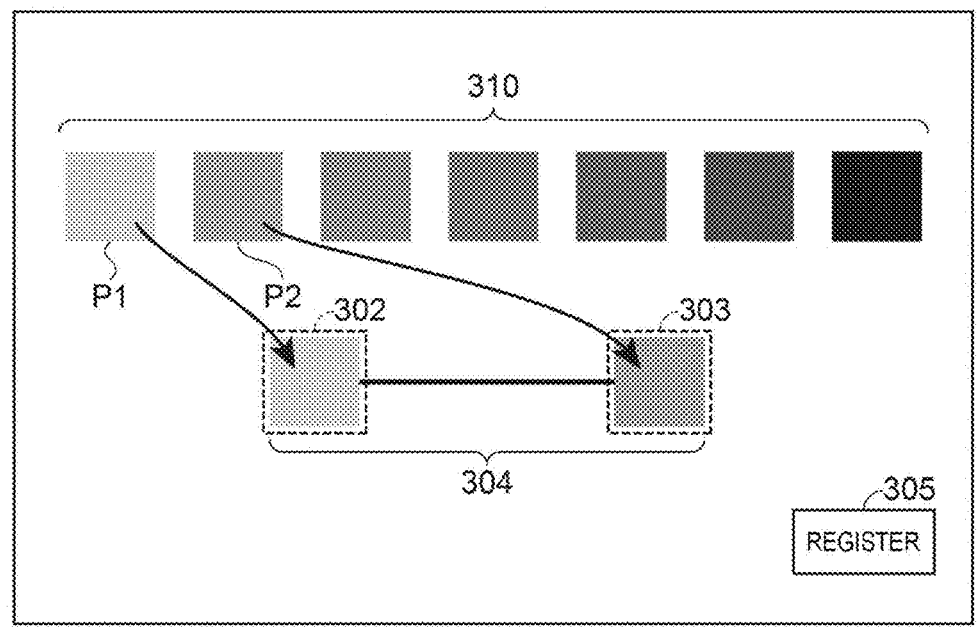
FIG. 17 schematically shows an example of a linking configuration by changing an alignment order.

As a linking configuration method 1, an example in which FIG. 17 is applied to the UI screen 801 in S217 is described below. Note that FIG. 17 is a diagram schematically illustrating an example of a linking configuration by a change in an alignment order.

The host apparatus 100 includes an adjustment point display processing unit configured to display, on the display device 115, a list of all adjustment points P0 configured in the adjustment coordinate reception unit U1, and thus, the linking configuration reception unit U4 can perform linking configuration by changing the alignment order of all adjustment points P0 displayed in the list.

Thus, when applying FIG. 17 to the UI screen 801, the UI screen 801, as illustrated in FIG. 17, includes an all adjustment points display region 310 to be drawn by the adjustment point display processing unit, the field for configuring a gradation start position 302, the field for configuring a gradation end position 303, the gradation configuration condition display region 304 to be displayed in S23A, and the registration button 305.

A list of all adjustment points received in S214 is displayed by the adjustment point display processing unit in the all adjustment points display region 310. FIG. 17 illustrates an example in which an adjustment point is displayed as a color standard configured of a coordinate value on the input color space CS4 of each adjustment point P0 received in S214 by the adjustment point display processing unit. Needless to say, an adjustment point is displayed not limited to as a color standard, but may be displayed by using a coordinate value and may be displayed as a color standard configured of a coordinate value of the output color space CS5.

FIG. 17 illustrates a state where linking configuration of the field for configuring a gradation start position 302 and the field for configuring a gradation end position 303 is performed by specifying an alignment order by dragging the color standards displayed in a list in the all adjustment points display region 310. Furthermore, an example is illustrated in which the gradation configuration condition display region 304 as well as the configuration region of the linking configuration is simultaneously displayed. Needless to say, the configuration region of the linking configuration may be separately displayed from a gradation designation condition display region. Here, an example is described in which the field for configuring a start position 302 and the field for configuring an end position 303 are set as a dedicated configuration region and the alignment order is configured on the configuration region, however, the configuration region may not be provided, and the linking configuration may be by changing the alignment order of the color standards on a displayed list. If the linking configuration is achieved by changing the alignment order of the color standards on the displayed list, it is effective to clarify a relationship in the list of the color standards in the all adjustment points display region 310, by disposing color standards configured with the linking configuration within close distance and disposing color standards not configured with the linking configuration within far distance. When employing such a technique, the gradation configuration condition display region 304 can be also simultaneously displayed and thus, a simple configuration of the UI screen 801 is possible. Note that the drag operation is received by the input device 116, and an input via a drag operation may be performed using a pointing device such as a mouse. When the display device 115 includes a touch panel, the input via the drag operation may be performed by a touch operation on the screen.

When the registration button 305 is activated in a state where color standards are designated in each of the field for configuring a start position 302 and the field for configuring an end position 303, linking configuration is performed with the adjustment points P0 configured as the two color standards being the end points of the gradation adjustment. After the linking configuration, an intermediate adjustment point is configured for gradation adjustment in S220, S222, and S224 described later.

Linking Configuration Method 2

Figure 18:
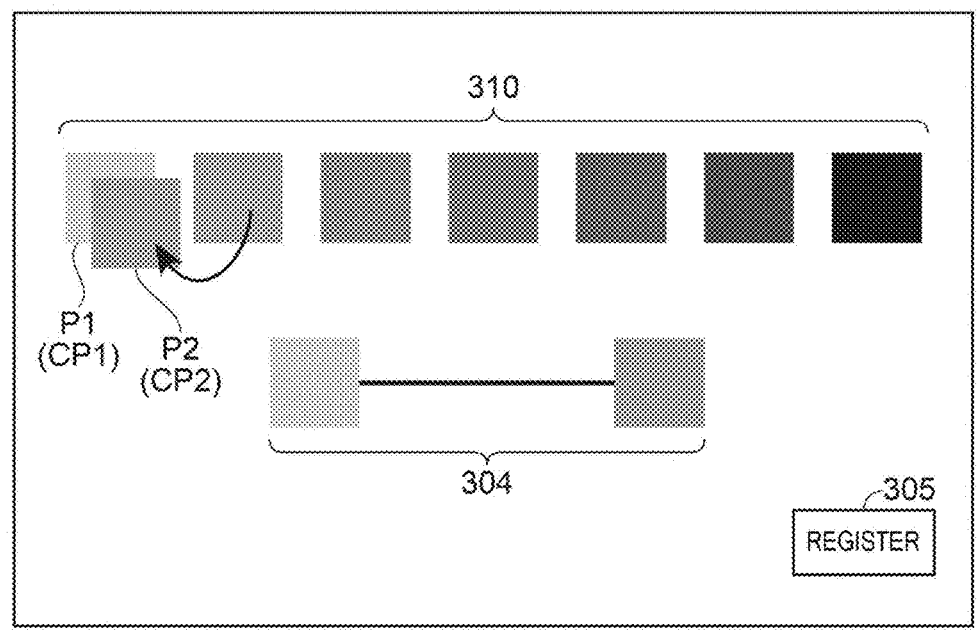
FIG. 18 schematically shows an example of a linking configuration by a drag-and-drop operation.

As a linking configuration method 2, an example in which FIG. 18 is applied to the UI screen 801 in S217 is described below. Note that FIG. 18 is a diagram schematically illustrating an example in which the linking configuration is applied by the drag-and-drop operation to the two color standards arbitrarily selected out of a list of color standards displayed in the all adjustment points display region 310.

The host apparatus 100 includes an adjustment point display processing unit configured to display, on the display device 115, a list of all adjustment points P0 configured in the adjustment coordinate reception unit U1, and thus, the linking configuration reception unit U4 can perform linking configuration through the drag-and-drop operation of all adjustment points P0 displayed in the list.

Thus, the UI screen 801, as illustrated in FIG. 18, includes the all adjustment points display region 310 to be drawn by the adjustment point display processing unit, the gradation configuration condition display region 304 to be displayed in S23A, and the registration button 305.

FIG. 18 illustrates a state where linking configuration is applied to a color standard CP1 and a color standard CP2 by dragging-and-dropping the color standard CP1 displayed in a list in the all adjustment points display region 310 onto the color standard CP2 different from the CP1 displayed in a list in the all adjustment points display region 310. In this case, in response to the operation of dragging-and-dropping the color standard CP1 onto the color standard CP2, S23A is executed, and the gradation configuration condition display region 304 is updated to a display configured of the color standard CP1 and the color standard CP2. In this technique, the all adjustment points display region 310 acts also as an interface of performing the linking configuration, and thus, it is possible to simply configure the UI screen 801. Note that the drag-and-drop operation is received by the input device 116, and an input via a drag-and-drop operation may be performed using a pointing device such as a mouse. When the display device 115 includes a touch panel, the input via the drag-and-drop operation may be performed by a touch operation on the screen.

When the registration button 305 is activated in a state where the drag-and-drop operation of the color standard CP1 and the color standard CP2 is executed, linking configuration is performed with the adjustment points P1 and P2 configured by the two color standards being the end points of the gradation adjustment. After the linking configuration, an intermediate adjustment point is configured for gradation adjustment in S220, S222, and S224 described later.

Linking Configuration Method 3

Figure 19:
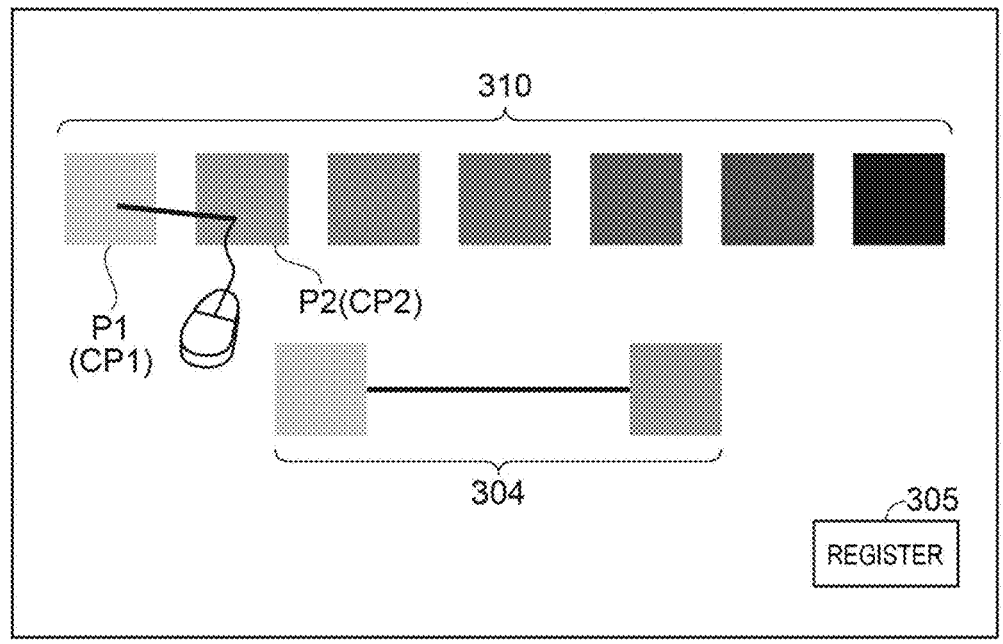
FIG. 19 schematically shows an example of a linking configuration by drawing a line.

As a linking configuration method 3, an example in which FIG. 19 is applied to the UI screen 801 in S217 is described below. Note that FIG. 19 is a diagram schematically illustrating an example of a linking configuration by drawing a line.

The host apparatus 100 includes an adjustment point display processing unit configured to display a list of all adjustment points P0 configured in the adjustment coordinate reception unit U1, in the display device 115, a line-drawing designation unit capable of designating, for the display device 115, a line connecting all adjustment points P0 displayed in the list, and a line-drawing processing unit configured to display the line designated by the line-drawing designation unit, in the display device 115, and thus, the linking configuration reception unit U4 can perform a linking configuration for the adjustment points P0 displayed in the list, by designating linking of the adjustment points P0 with a line in the line-drawing designation unit.

Thus, when FIG. 19 is applied to the UI screen 801, the UI screen 801 as illustrated in FIG. 19 includes the all adjustment points display region 310 to be drawn by the adjustment point display processing unit, the gradation configuration condition display region 304 to be displayed in S23A, and the registration button 305.

FIG. 19 illustrates a state where the linking configuration is applied to the color standard CP1 and the color standard CP2 by drawing a line between the color standard CP1 displayed in a list in the all adjustment points display region 310 and the color standard CP2 different from the CP1 displayed in a list in the all adjustment points display region 310. In this case, in response to the line drawing operation, S23A is executed, and the gradation configuration condition display region 304 is updated to a display configured of the color standard CP1 and the color standard CP2. In this technique, the all adjustment points display region 310 acts also as an interface of performing the linking configuration, and thus, it is possible to simply configure the UI screen 801. In addition, even when the number of configurations of the linking configuration increases (when a plurality of linking configurations are simultaneously designated, for example, in a case where the linking configuration is applied to the color standard CP1 and the color standard CP2, the linking configuration is further applied to the color standard CP2 and the color standard CP3, and the linking configuration is further applied to the color standard CP3 and the color standard CP1), the associated color standards are linked with a line to be displayed, and thus, irrespective of the positional relationship of the list displayed in the all adjustment points display region 310, it is easy to grasp the designation situation of the linking configuration. Note that the input operation of the line trajectory upon drawing a line is received by the input device 116, and the line trajectory may be input using a pointing device such as a mouse. When the display device 115 includes a touch panel, the trajectory input may be performed by a touch operation on the screen. Needless to say, the line trajectory can be directly input, and in addition, another configuration may be such that two end points included in the line are input by the input device 116 to draw a line linking the end points.

When the registration button 305 is activated in a state where the line drawing is executed between the color standard CP1 and the color standard CP2, the linking configuration is performed with the adjustment points P1 and P2 configured by the two color standards linked with the line being the end points of the gradation adjustment. After the linking configuration, an intermediate adjustment point is configured for gradation adjustment in S220, S222, and S224 described later.

Linking Configuration Method 4

Figure 20:
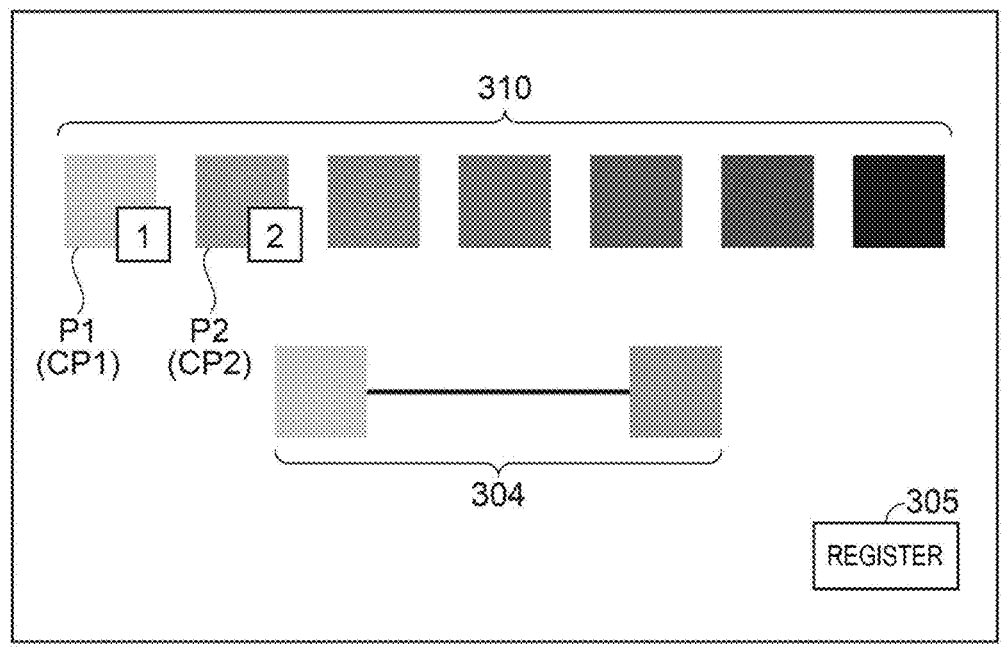
FIG. 20 schematically shows an example of a linking configuration according to a selection order.

As a linking configuration method 4, an example in which FIG. 20 is applied to the UI screen 801 in S217 is described below. Note that FIG. 20 is a diagram schematically illustrating an example of the linking configuration according to a selection order.

The host apparatus 100 includes an adjustment point display processing unit configured to display, on the display device 115, a list of all adjustment points P0 configured in the adjustment coordinate reception unit U1, and thus, the linking configuration reception unit U4 can perform the linking configuration according to the selection order of the adjustment points P0 displayed in the list.

Thus, when FIG. 20 is applied to the UI screen 801, the UI screen 801, as illustrated in FIG. 20, includes the all adjustment points display region 310 drawn by the adjustment point display processing unit, the gradation configuration condition display region 304 to be displayed in S23A, and the registration button 305.

FIG. 20 illustrates a state where color standards CPn displayed in a list in the all adjustment points display region 310 are selected successively to perform linking configuration. In this case (in FIG. 20, a selected color standards is displayed along with a number according to the selection order therefor) in response to the selection operation of the color standards, S23A is executed, and the gradation configuration condition display region 304 is updated to a display configured of the selected color standard. In this technique, the linking configurations can be easily increased by repeatedly performing the selection and thus, when a user wants to select, for example, as the region to be adjusted, a region in which three adjustment points P0 such as from White ((C, M, Y, K)=(0, 0, 0, 0)) to Black ((C, M, Y, K)=(100, 100, 100, 100)) through Cyan ((C, M, Y, K)=(100, 0, 0, 0)) are sequentially linked, the linking configuration can be easily performed by sequentially selecting the color standard. Furthermore, the all adjustment points display region 310 acts also as an interface of performing the linking configuration, and thus, it is possible to simply configure the UI screen 801. Note that the input operation of the color standard selection is received by the input device 116, and the color standard may be selected by utilizing a pointing device such as a mouse. When the display device 115 includes a touch panel, the color standard may be selected by a touch operation on the screen.

When the registration button 305 is activated in a state where all color standards are selected, the linking configuration is performed with the adjustment points P1 and P2 configured by all of the selected color standards being the end points of the gradation adjustment respectively. After the linking configuration, an intermediate adjustment point is configured for gradation adjustment in S220, S222, and S224 described later. Note that, when three or more color standards are selected, an intermediate adjustment point is configured between the first selected color standard CP1 and the second selected color standard CP2 and subsequently, an intermediate adjustment point is configured between the second selected color standard CP2 and the third selected color standard CP3. Afterwards, by repeating the procedure in accordance with the number of selected color standards, a gradation linking a plurality of adjustment points $P_n$ can easily be also adjusted.

In S23B, a display method is described in which, when the host apparatus 100 receives an operation on the button for confirming an adjustment location 846 on the UI screen 800 illustrated in FIG. 7, the UI screen 802 illustrated in FIG. 14 is displayed on the display device 115, however, the following display method may be employed.

Display Method 1

Figure 21:
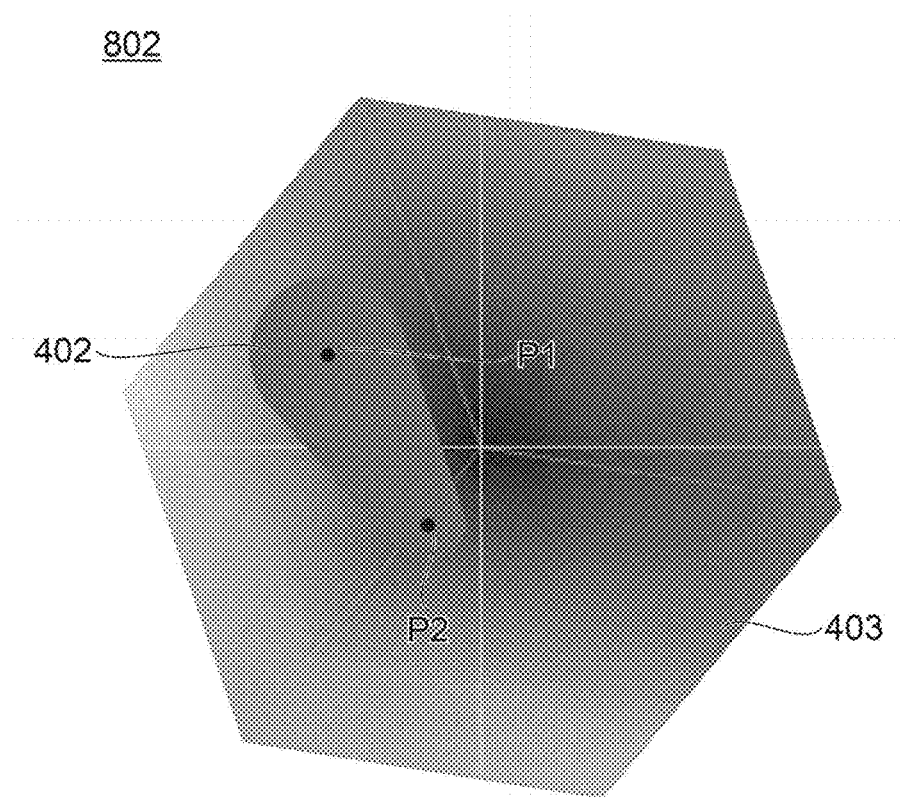
FIG. 21 schematically shows an influence range display on an input color space.

For a display method 1, an example in which FIG. 21 is applied to the UI screen 802 in S23B is described below. Note that FIG. 21 is a diagram schematically illustrating an influence range display on an input color space.

The host apparatus 100 includes an input color space display processing unit configured to display, in the display device 115, an input color space shape of the profile to be adjusted 550, and thus, the whole adjustment influence range display processing unit UB can display the whole adjustment influence range in an overlapping manner on the input color space shape drawn on the display device 115 by the input color space display processing unit.

Thus, when FIG. 21 is applied to the UI screen 802, the UI screen 802, as illustrated in FIG. 21, includes the adjustment influence region 402 and a schematic drawing 403 of the color space.

FIG. 21 illustrates an example in which a schematic diagram of a whole area of an RGB space in a case that RGB is selected for the input color space CS4 is displayed as the schematic drawing 403 of the color space, a shape expressing, on the input color space CS4, whole influence range configured in S215 and S224 is expressed by spot coloring as the adjustment influence region 402 and is displayed in an overlapping manner on the schematic drawing 403 of the color space. Needless to say, the input color space CS4 may also be CMYK, and also when the input color space CS4 is replaced by the output color space CS5, the same representation is possible for the schematic drawing 403 of the color space. However, when the color space is the output color space CS5, and when both the input profile 610 and the output profile 620 are designated in S211 in FIG. 6, for example, a region OArea drawn as the adjustment influence region 402 can convert an IArea represented on the input color space CS4 by the $f_{icc}$ as follows.

$$\text{OArea}=f_{icc}(\text{Output Profile}, B2A, f_{icc}(\text{Input Profile}, A2B, \text{IArea}))$$

In the present specific example, the adjusted profile will be applied to a plurality of images to execute adjustment for the profiles. In such a case, an adjustment effect obtained for each image upon application to the image can be anticipated by grasping the adjustment influence region on the input (output) color space and thus, efficient profile adjustment can be performed.

Furthermore, when the linking configuration is applied to the plurality of adjustment points $P_n$, the adjustment will be executed after configuring the third adjustment points Q and the influence ranges of the third adjustment points Q, as illustrated in FIG. 13B. In this case, the adjustment influence range can be accurately grasped by visually displaying an influence range that also includes the influence ranges configured for the third adjustment points Q.

Display Method 2

Figure 22:
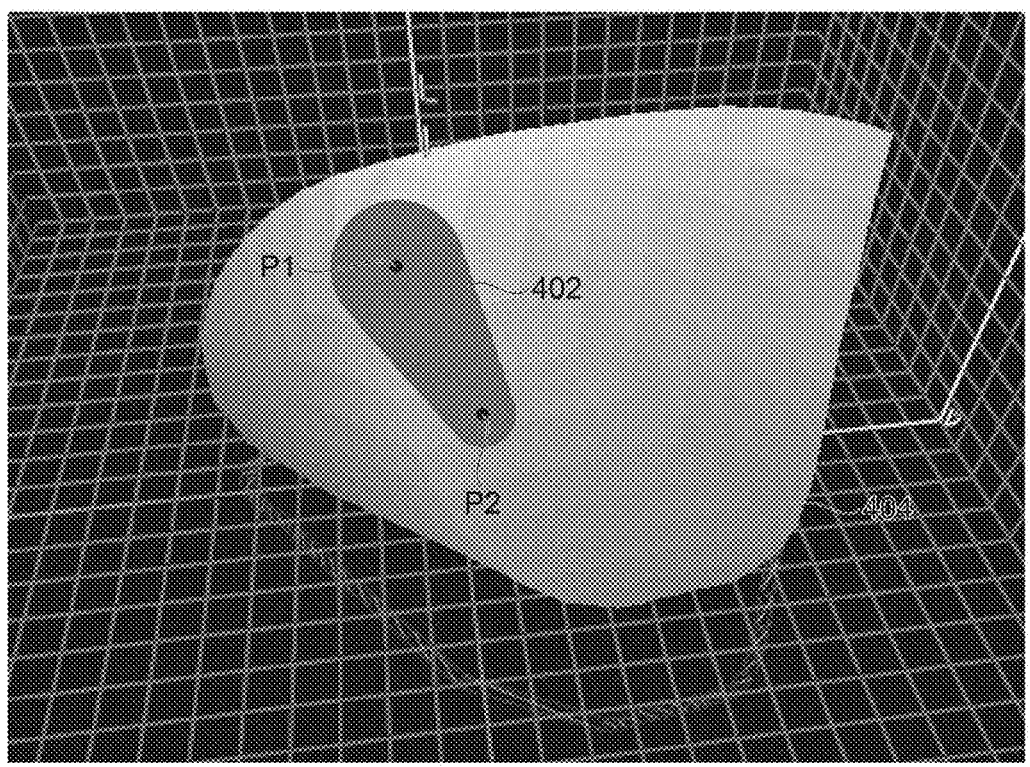
FIG. 22 schematically shows an influence range display on a profile gamut.

For a display method 2, an example in which FIG. 22 is applied to the UI screen 802 in S23B is described below. Note that FIG. 22 is a diagram schematically illustrating an influence range display on a profile gamut.

The host apparatus 100 includes a color conversion unit configured to convert the whole adjustment influence range configured in the adjustment influence range reception unit U3 and the adjustment influence range configuration unit U6 into an Lab space and a gamut display processing unit configured to display, on the display device 115, a gamut model shape of the profile to be adjusted 550, and thus, the whole adjustment influence range display processing unit UB can display the whole adjustment influence range in an overlapping manner on the gamut shape drawn on the display device 115 by the gamut display processing unit.

Thus, when FIG. 22 is applied to the UI screen 802, the UI screen 802, as illustrated in FIG. 22, includes the adjustment influence region 402 and a schematic drawing 404 of the profile gamut.

FIG. 22 illustrates an example in which the schematic drawing 404 of the profile gamut is displayed which the profile gamut in a case that RGB is selected for the input color space CS4 is drawn over a whole area of the Lab space, a shape expressing whole influence range configured in S215 and S224 after conversion to values on the Lab space is represented by spot coloring as the adjustment influence region 402, and is displayed in an overlapping manner on the schematic drawing 404 of the profile gamut. Needless to say, the input color space CS4 may be CMYK. Here, when both the input profile 610 and the output profile 620 are designated in S211 in FIG. 6, for example, the shapes of the profile gamut 404 and the adjustment influence region 402 is an IArea (profile gamut) expressed on the input color space CS4 and an IArea (adjustment influence region) can be converted into an LabArea (profile gamut) and an LabArea (adjustment influence region) by the $f_{icc}$ as follows.

$$\text{LabArea}=f_{icc}(\text{Input Profile}, A2B, \text{IArea})$$

In the present specific example, the adjusted profile will be applied to a plurality of color conversions to execute adjustment for the profiles. In such a case, an adjustment effect in the plurality of color conversions can be grasped as a numerical value on the Lab space by grasping the adjustment influence region on the Lab color space that is a device-independent color space, and thus, efficient profile adjustment can be performed. Furthermore, by grasping a positional relationship on the Lab space, a relative relationship with the profile gamut can be visually grasped, and thus, more efficient adjustment can be performed by configuring the adjustment region after grasping whether a designation of a current adjustment region is inside or outside of the profile gamut. Note that, for the purpose of grasping an inside-outside relationship with respect to the profile gamut, it is also effective to convert the IArea (profile gamut) as follows and display the LabArea (profile gamut) as an output profile gamut on the profile gamut 404.

LabArea (profile gamut)=$f_{icc}$(Output Profile, *A2B*, $f_{icc}$(Output Profile, *B2A*, $f_{icc}$(Input Profile, *A2B*, IArea)))

A relationship between a gamut shape of the output device and the adjustment region configuration can be visually grasped by displaying the profile gamut 404 as the output profile gamut.

Furthermore, when the linking configuration is applied to the plurality of adjustment points $P_n$, the adjustment will be executed after configuring the third adjustment points Q and the influence ranges of the third adjustment points Q, as illustrated in FIG. 13B. In this case, the adjustment influence range can be accurately grasped by visually displaying an influence range also including the influence ranges configured for the third adjustment points Q.

Display Method 3

Figure 23:
FIG. 23 schematically shows an influence range display in a gradation image.

For a display method 3, an example in which FIG. 23 is applied to the UI screen 802 in S23B is described below. Note that FIG. 23 is a diagram schematically illustrating an influence range display in a gradation image.

The host apparatus 100 includes a gradation image generation unit configured to generate a gradation image linking any two adjustment points P1 and P2, and thus, the whole adjustment influence range display processing unit UB can display, in the display device 115, a gradation image generated by the gradation image generation unit, based on each adjustment point P0 designated by the linking configuration reception unit U4.

Thus, when FIG. 23 is applied to the UI screen 802, the UI screen 802, as illustrated in FIG. 23, includes a gradation image 405.

A gradation generated in a case that two sets of linking configuration are executed from the button for configuring a gradation 844 illustrated in FIG. 7, is displayed in FIG. 23 as the gradation image 405, when RGB is selected for the input color space CS4. When the linking configuration is applied to the plurality of adjustment points $P_n$, the whole adjustment influence range will be determined after the third adjustment points Q and the influence ranges of the third adjustment points Q are configured, as illustrated in FIG. 13B. In the present example, a color that receives an influence in the profile adjustment can be visually grasped by continuously displaying, as the gradation, a color between adjustment points applied with the linking configuration including the third adjustment points Q and the influence ranges disposed in the third adjustment points Q, and thus, efficient adjustment is possible. Note that, as illustrated in FIG. 13B, when the adjustment influence ranges, including the adjustment influence ranges provided for the third adjustment points Q, are formed into a circle, a color included in the adjustment influence range is configured to be not limited to on a line having a linked adjustment point as a boundary value but to include a surrounding color. Although not illustrated, the influence range can be grasped more accurately by displaying a gradation including a surrounding color in accordance with the shape of the adjustment influence range, and thus, efficient profile adjustment can be performed.

6. Conclusions

The present invention is a profile adjustment system configured to adjust, based on a parameter for displaying in a display device 115, a profile specifying a correspondence relationship between an input coordinate value of an input color space CS4 and an output coordinate value of an output color space CS5, and has an aspect including: an adjustment coordinate reception unit U1 configured to display, in the display device 115, an input field of a coordinate of an adjustment point P0 disposed on a color space and to receive a coordinate configuration of the adjustment point P0; an adjustment influence range reception unit U3 configured to display, in the display device 115, an input field of an adjustment influence range of the adjustment point P0 disposed on the color space and to receive a configuration of an adjustment influence range of the adjustment point P0; a linking configuration reception unit U4 configured to display, in the display device 115, an input field of a linking configuration between each of at least two or more of the adjustment points configured in the adjustment coordinate reception unit U1 and the adjustment influence range reception unit U3 and to receive a linking configuration between each of the adjustment points P as needed; a linking configuration display processing unit UA configured to display, in the display device 115, a linking configuration condition configured in the linking configuration reception unit U4; an adjustment coordinate configuration unit U5 configured to configure a coordinate of a new adjustment point $Q_x$ between each of the adjustment points $P_n$ configured in the linking configuration reception unit U4; an adjustment influence range configuration unit U6 configured to configure an adjustment influence range for the new adjustment point $Q_x$ configured in the adjustment coordinate configuration unit U5; a whole adjustment influence range display processing unit UB configured to display, in the display device 115, a whole adjustment influence range including the adjustment influence range reception unit U3, the linking configuration reception unit U4, the adjustment coordinate configuration unit U5, and the adjustment influence range configuration unit U6; and a profile adjustment unit U7 configured to adjust the profile based on all adjustment points P0 configured in the adjustment coordinate reception unit U1 and an adjustment point Qx added by the adjustment coordinate configuration unit U5.

Furthermore, the present invention has an aspect of a profile adjustment device of causing a device to realize an operation corresponding to each unit ("section") of the above-mentioned profile adjustment system.

Furthermore, the present invention has an aspect of a profile adjustment program PR0 of causing a computer to realize a function corresponding to each unit ("section") of the above-mentioned profile adjustment system.

Moreover, the present invention has an aspect of a profile adjustment method including a step corresponding to each unit ("section") of the above-mentioned profile adjustment system.

As described above, according to various types of aspects, the present invention can provide a technology and the like of easily improving a gradation of an output image while grasping an influence range. Needless to say, with the technology including only a constituent requirement according to the independent claim, it is possible to obtain the basic operation and effect described above.

Further, a configuration obtained by mutually replacing each configuration disclosed in the above-described example and by modifying a combination thereof, a configuration obtained by mutually replacing each configuration disclosed in the well-known art and the above-described example and by modifying a combination thereof, and the like may be implemented. The present invention includes these configurations and the like.

This application claims priority under 35 U.S.C. § 119 to Japanese Patent Application No. 2017-213525, filed Nov. 6 2017. The entire disclosure of Japanese Patent Application No. 2017-213525 is hereby incorporated herein by reference.

What is claimed is:

1. A profile adjustment system configured to adjust, based on a parameter displayed in a display unit, a profile specifying a correspondence relationship between an input coordinate value of an input color space and an output coordinate value of an output color space, comprising:
    an adjustment coordinate reception unit configured to display, in the display unit, an input field of a coordinate of an adjustment point disposed on the color space and to receive a coordinate configuration of the adjustment point;
    an adjustment influence range reception unit configured to display, in the display unit, an input field of an adjustment influence range of the adjustment point disposed on the color space and to receive a configuration of an adjustment influence range of the adjustment point;
    a linking configuration reception unit configured to display, in the display unit, an input field of a linking configuration between each of at least two or more of the adjustment points configured in the adjustment coordinate reception unit and the adjustment influence range reception unit and to receive a linking configuration between each of the adjustment points as needed;
    a linking configuration display processing unit configured to display, in the display unit, a linking configuration condition configured in the linking configuration reception unit;
    an adjustment coordinate configuration unit configured to configure a coordinate of a new adjustment point between each of the adjustment points configured in the linking configuration reception unit;
    an adjustment influence range configuration unit configured to configure an adjustment influence range for the new adjustment point configured in the adjustment coordinate configuration unit;
    a whole adjustment influence range display processing unit configured to display, in the display unit, a whole adjustment influence range including the adjustment influence range reception unit, the linking configuration reception unit, the adjustment coordinate configuration unit, and the adjustment influence range configuration unit; and
    a profile adjustment unit configured to adjust the profile based on all adjustment points configured in the adjustment coordinate reception unit and an adjustment point added by the adjustment coordinate configuration unit.

2. The profile adjustment system according to claim 1, further comprising:
    an identifier assignment unit configured to assign an identifier to an adjustment point configured in the adjustment coordinate reception unit;
    an identifier display processing unit configured to associate the identifier assigned by the identifier assignment unit with the coordinate configured in the adjustment coordinate reception unit and to display the identifier associated with the coordinate in the display unit; and
    an adjustment point display processing unit configured to display a list of all adjustment points configured in the adjustment coordinate reception unit, in the display unit, wherein
    in the linking configuration reception unit, a linking configuration is performed by designating the identifier assigned by the identifier assignment unit.

3. The profile adjustment system according to claim 1, further comprising:
    an adjustment point display processing unit configured to display a list of all adjustment points configured in the adjustment coordinate reception unit, in the display unit, wherein
    in the linking configuration reception unit, a linking configuration is performed by changing an alignment order of all the adjustment points displayed in the list.

4. The profile adjustment system according to claim 1, further comprising:
    an adjustment point display processing unit configured to display a list of all adjustment points configured in the adjustment coordinate reception unit, in the display unit, wherein
    in the linking configuration reception unit, a linking configuration is performed by a drag-and-drop operation between two arbitrarily selected points among all the adjustment points displayed in the list.

5. The profile adjustment system according to claim 1, further comprising:
    an adjustment point display processing unit configured to display a list of all adjustment points configured in the adjustment coordinate reception unit, in the display unit;
    a line-drawing designation unit configured to designate, for the display unit, a line connecting the all adjustment points displayed in the list; and
    a line-drawing processing unit configured to display the line designated by the line-drawing designation unit, in the display unit, wherein
    in the linking configuration reception unit, a linking configuration is performed for the adjustment points displayed in the list, by designating linking of the adjustment points with a line in the line-drawing designation unit.

6. The profile adjustment system according to claim 1, further comprising:
    an adjustment point display processing unit configured to display a list of all adjustment points configured in the adjustment coordinate reception unit, in the display unit, wherein
    in the linking configuration reception unit, a linking configuration is performed according to a selection order of the adjustment points displayed in the list.

7. The profile adjustment system according to claim 1, further comprising:
    an image display processing unit configured to display any image in the display unit, wherein
    the whole adjustment influence range display processing unit displays a region included in the whole adjustment influence range in an overlapping manner on any image displayed in the display unit by the image display processing unit.

8. The profile adjustment system according to claim 1, further comprising:
    an input color space display processing unit configured to display an input color space shape of a profile to be adjusted, in the display unit, wherein the whole influence range display processing unit displays the whole adjustment influence range in an overlapping manner on an input color space shape drawn on the display unit by the input color space display processing unit.

9. The profile adjustment system according to claim 1, further comprising:
   a color conversion unit configured to convert the whole adjustment influence range configured in the adjustment influence range reception unit and the adjustment influence range configuration unit into an Lab space; and
   a gamut display processing unit configured to display, in the display unit, a gamut model shape of a profile to be adjusted, wherein
   the whole adjustment influence range display processing unit displays the whole adjustment influence range in an overlapping manner on the gamut shape drawn in the display unit by the gamut display processing unit.

10. The profile adjustment system according to claim 1, further comprising:
   a gradation image generation unit configured to generate a gradation image linking any two of the adjustment points, wherein
   the whole adjustment influence range display processing unit displays, in the display unit, a gradation image generated by the gradation image generation unit, based on each of the adjustment points designated by the linking configuration reception unit.

11. A profile adjustment device configured to adjust, based on a parameter displayed in a display unit, a profile specifying a correspondence relationship between an input coordinate value of an input color space and an output coordinate value of an output color space, comprising:
   an adjustment coordinate reception unit configured to display, in the display unit, an input field of a coordinate of an adjustment point disposed on the color space and to receive a coordinate configuration of the adjustment point;
   an adjustment influence range reception unit configured to display, in the display unit, an input field of an adjustment influence range of the adjustment point disposed on the color space and to receive a configuration of an adjustment influence range of the adjustment point;
   a linking configuration reception unit configured to display, in the display unit, an input field of a linking configuration between each of at least two or more of the adjustment points configured in the adjustment coordinate reception unit and the adjustment influence range reception unit and to receive a linking configuration between each of the adjustment points as needed;
   a linking configuration display processing unit configured to display, in the display unit, a linking configuration condition configured in the linking configuration reception unit;
   an adjustment coordinate configuration unit configured to configure a coordinate of a new adjustment point between each of the adjustment points configured in the linking configuration reception unit;
   an adjustment influence range configuration unit configured to configure an adjustment influence range for the new adjustment point configured in the adjustment coordinate configuration unit;
   a whole adjustment influence range display processing unit configured to display, in the display unit, a whole adjustment influence range including the adjustment influence range reception unit, the linking configuration reception unit, the adjustment coordinate configuration unit, and the adjustment influence range configuration unit; and
   a profile adjustment unit configured to adjust the profile based on all adjustment points configured in the adjustment coordinate reception unit and an adjustment point added by the adjustment coordinate configuration unit.

12. A profile adjustment method of adjusting, based on a parameter displayed in a display unit, a profile specifying a correspondence relationship between an input coordinate value of an input color space and an output coordinate value of an output color space, comprising:
   performing adjustment coordinate reception including displaying, in the display unit, an input field of a coordinate of an adjustment point disposed on the color space and receiving a coordinate configuration of the adjustment point;
   performing adjustment influence range reception including displaying, in the display unit, an input field of an adjustment influence range of the adjustment point disposed on the color space and receiving a configuration of an adjustment influence range of the adjustment point;
   performing linking configuration reception including displaying, in the display unit, an input field of a linking configuration between each of at least two or more of the adjustment points configured during the adjustment coordinate reception and the adjustment influence range reception and receiving a linking configuration between each of the adjustment points as needed;
   performing linking configuration display processing including displaying, in the display unit, a linking configuration condition configured during the linking configuration reception;
   performing adjustment coordinate configuration including configuring a coordinate of a new adjustment point between each of the adjustment points configured during the linking configuration reception;
   performing adjustment influence range configuration including configuring an adjustment influence range for the new adjustment point configured during the adjustment coordinate configuration;
   performing whole adjustment influence range display processing including displaying, in the display unit, a whole adjustment influence range including the adjustment influence range reception, the linking configuration reception, the adjustment coordinate configuration, and the adjustment influence range configuration; and
   performing profile adjustment including adjusting the profile based on all adjustment points configured during the adjustment coordinate reception and an adjustment point added during the adjustment coordinate configuration.

* * * * *